US008937138B2

(12) United States Patent
Wu et al.

(10) Patent No.: US 8,937,138 B2
(45) Date of Patent: *Jan. 20, 2015

(54) INITIATING SYSTEM FOR CATIONIC POLYMERIZATION AND POLYMERIZATION PROCESS

(75) Inventors: Yixian Wu, Beijing (CN); Qiang Huang, Beijing (CN); Han Zhou, Beijing (CN); Ruting Jin, Beijing (CN); Ping He, Beijing (CN)

(73) Assignees: China Petroleum & Chemical Corporation, Beijing (CN); Beijing University of Chemical Technology, Beijing (CN)

( * ) Notice: Subject to any disclaimer, the term of this patent is extended or adjusted under 35 U.S.C. 154(b) by 52 days.

This patent is subject to a terminal disclaimer.

(21) Appl. No.: 13/497,453

(22) PCT Filed: Sep. 21, 2010

(86) PCT No.: PCT/CN2010/001463
§ 371 (c)(1),
(2), (4) Date: Sep. 5, 2012

(87) PCT Pub. No.: WO2011/035545
PCT Pub. Date: Mar. 31, 2011

(65) Prior Publication Data
US 2012/0329973 A1   Dec. 27, 2012

(30) Foreign Application Priority Data

Sep. 25, 2009  (CN) .......................... 2009 1 0092795
Aug. 19, 2010  (CN) .......................... 2010 1 0257363
Aug. 19, 2010  (CN) .......................... 2010 1 0257364

(51) Int. Cl.
| C08F 4/52 | (2006.01) |
| C08F 4/28 | (2006.01) |
| C08F 2/00 | (2006.01) |
| C08F 210/00 | (2006.01) |
| C08F 214/06 | (2006.01) |
| C08F 36/00 | (2006.01) |
| C08F 10/10 | (2006.01) |
| C08F 210/12 | (2006.01) |

(52) U.S. Cl.
CPC ............... C08F 10/10 (2013.01); *C08F 210/12* (2013.01)
USPC ........... 526/197; 526/227; 526/348; 526/210; 526/348.7; 526/346; 526/335

(58) Field of Classification Search
USPC .............. 526/197, 227, 348, 210, 348.7, 346, 526/335
See application file for complete search history.

(56) References Cited

U.S. PATENT DOCUMENTS

| 3,640,983 A * | 2/1972 | Horiguchi et al. ............ 526/204 |
| 4,154,916 A | 5/1979 | Wagensommer et al. |
| 4,269,955 A | 5/1981 | Wagensommer et al. |
| 5,418,303 A | 5/1995 | Shaffer |
| 5,668,232 A | 9/1997 | Langstein et al. |
| 6,008,307 A | 12/1999 | Shaffer |
| 6,300,444 B1 | 10/2001 | Tokumoto et al. |
| 7,202,371 B2 | 4/2007 | Yamamoto et al. |
| 7,485,764 B2 | 2/2009 | Rath et al. |
| 2004/0014902 A1 | 1/2004 | Johnson et al. |
| 2004/0014911 A1 | 1/2004 | Huffer et al. |
| 2009/0130568 A1* | 5/2009 | Tomari et al. ..................... 430/2 |
| 2012/0238715 A1 | 9/2012 | Wu et al. |

FOREIGN PATENT DOCUMENTS

| CA | 2 775 005 A1 | 3/2012 |
| CN | 87103538 A | 11/1987 |
| CN | 1277212 A | 12/2000 |
| CN | 1277617 A | 12/2000 |
| CN | 1681847 A | 10/2005 |
| CN | 101423579 A | 5/2009 |
| EP | 0969026 A1 | 1/2000 |
| EP | 1013679 A1 | 6/2000 |
| JP | 10-504048 A | 4/1998 |
| JP | 10130315 A | 5/1998 |
| JP | 11080221 A | 3/1999 |
| JP | 2000017020 A | 1/2000 |
| JP | 2006523767 A | 10/2006 |
| WO | WO 2004/094481 A2 | 11/2004 |
| WO | WO 2004/094486 A1 | 11/2004 |

OTHER PUBLICATIONS

PCT International Search Report mailed Dec. 30, 2010, in International Application No. PCT/CN2010/001462.
PCT Written Opinion of the International Searching Authority mailed Dec. 30, 2010, in International Application No. PCT/CN2010/001462.
PCT International Preliminary Report on Patentability issued Jul. 26, 2011, in International Application No. PCT/CN2010/001462.
PCT International Search Report mailed Jan. 13, 2011, in International Application No. PCT/CN2010/001463.
PCT Written Opinion of the International Searching Authority mailed Jan. 13, 2011, in International Application No. PCT/CN2010/001463.
PCT International Preliminary Report on Patentability issued Jul. 26, 2011, in International Application No. PCT/CN2010/001463.
Kostjuk et al., "Cationic polymerization of styrene in solution and aqueous suspension using $B(C_6F_5)_3$ as a water-tolerant Lewis acid," *Macromolecules*, 39: 3110-3113 (2006).

(Continued)

*Primary Examiner* — William Cheung
(74) *Attorney, Agent, or Firm* — Finnegan, Henderson, Farabow, Garrett & Dunner, LLP

(57) ABSTRACT

The present invention discloses an initiating system for cationic polymerization and a polymerization process. The present application relates to an initiating system for cationic polymerization of cationic-polymerizable monomers, and a process for cationic polymerization of cationic-polymerizable monomers by using the initiating system. The present invention particular involves an initiating system for cationic polymerization of cationic-polymerizable monomers in an aqueous reaction medium, and a process for cationic polymerization of cationic-polymerizable monomers by using the initiating system in an aqueous reaction medium.

13 Claims, No Drawings

(56) References Cited

OTHER PUBLICATIONS

Kostjuk et al., "Controlled cationic polymerization of cyclopentadiene with $B(C_6F_5)_3$ as a coinitiator in the presence of water," *J. Polym. Sci.: Part A: Polymer Chemistry*, 46: 4734-4747 (2008).

Lewis et al., "Aqueous suspension polymerization of isobutene initiated by 1,2-$C_6F_4[B(C_6F_5)_2]_2$," *J. Am. Chem. Soc.*, 127: 46-47 (2005).

Radchenko et al., "Controlled/living cationic polymerization of styrene with $BF_3OEt_2$ as a coinitiator in the presence of water: Improvements and limitations," *Eur. Polym. J.*, 43: 2576-2583 (2007).

Bauers, F.M. et al. (2001) "Aqueous Homo- and Copolymerization of Ethylene by Neutral Nickel(II) Complexes" *Macromolecules*, 34:1165-1171.

Satoh, K. et al. (1999) "Controlled Cationic Polymerization of p-Methoxystyrene in Aqueous Media with $Yb(OTf)_3$" *Macromolecules*, 32(12):3827-3832.

Satoh, K. et al. (2000) "Lanthanide Triflates-Mediated Emulsion Cationic Polymerization of p-Alkoxystyrenes in Aqueous Media" *Macromolecules*, 33:4660-4666.

Satoh, K. et al. (2000) "Metal Triflates and Tetrafluoroborates as Water-Tolerant Lewis Acids for Cationic Polymerization in Aqueous Media" *Macromolecules*, 33:5836-5840.

Soula, R. et al. (2002) "Catalytic Copolymerization of Ethylene and Polar and Nonpolar α-Olefins in Emulsion" *Macromolecules*, 35:1513-1523.

Fulmer et al. (2010), "NMR Chemical Shifts of Trace Impurities: Common Laboratory Solvents, Organics, and Gases in Deuterated Solvents Relevant to the Organometallic Chemist" *Organometallics*, 29:2176-2679.

Heaney, H. (1995) "Boron Trifluoride" in *Encyclopedia of Reagents for Organic Synthesis*. Paquette, L.A. (Ed.); John Wiley & Sons, Ltd.: Chichester, England. vol. 1, p. 651.

Satoh, K. et al. (2001) "Novel $BF_3OEt_2$/R-OH Initiating System for Controlled Cationic Polymerization of Styrene in the Presence of Water" *Macromolecules*, 34:396-401.

Kostjuk, S.V. et al., "Controlled/Living Cationic Polymerization of p-Methoxystyrene in Solution and Aqueous Dispersion Using Tris(pentafluorophenyl)borane as a Lewis Acid: Acetonitrile Does the Job" *Macromolecules*, 40:482-490 (2007).

European Patent Application No. 10818238 by China Petroleum & Chemical Corp. et al.: Extended European Search Report, including Supplementary Search Report and Opinion, dated Jan. 28, 2014.

European Patent Application No. 10818239 by China Petroleum & Chemical Corp. et al.: Extended European Search Report, including Supplementary Search Report and Opinion, dated Jan. 28, 2014.

Canadian Patent Application No. 2,775,006: Office Action dated Aug. 25, 2014.

Satoh et al., "Direct Synthesis of Amphiphilic Random and Block Copolymers of p-Hydroxystyrene and p-Methoxystyrene via Living Cationic Polymerization with $BF_3OEt_2$/ROH Systems," *Macromolecules* 33:5830-5835 (2000).

Canadian Patent Application No. 2,775,006 Office Action dated May 5, 2014.

* cited by examiner

INITIATING SYSTEM FOR CATIONIC POLYMERIZATION AND POLYMERIZATION PROCESS

TECHNICAL FIELD

The present application relates to an initiating system for cationic polymerization of cationic-polymerizable monomers, and a process for cationic polymerization of cationic-polymerizable monomers by using the initiating system. The present invention particular relates to an initiating system for cationic polymerization of cationic-polymerizable monomers in an aqueous reaction medium, and a process for cationic polymerization of cationic-polymerizable monomers by using the initiating system in an aqueous reaction medium.

BACKGROUND OF THE INVENTION

Cationic polymerization as one or the primary processes for ionic polymerization has been widely applied for preparing many polymer materials, such as synthetic rubber, oil additives, plastic modifiers and the like. Since trace of impurities have an extremely great effect on the cationic polymerization process, the polymerization needs to be conducted under the conditions of almost no oxygen, no water and under protection with high purity inert gas. Taking the production of the typical industrial product of cationic polymerization-butyl rubber as an example, the polymerization needs to be conducted in the reaction medium of dry chloroalkane at a temperature as low as −100° C. Meanwhile, the water and oxygen content in the polymerization system should be strictly controlled to be several ppm or even lower to synthesize butyl rubber having high molecular weight. Thus the technological procedures of such polymerization are complicated, have strict requirements on the equipment and raw materials and have a high production cost. The current similar cationic polymerization system uses pure organic solvents as the reaction medium, and requires that the water content therein is lower than several ppm.

If water is used as the environmentally-friendly reaction medium for cationic polymerization, it may simplify the polymerization process, need less requirements on the equipments and reaction conditions, reduce the production cost and improve the heat transfer. Therefore, it has an important meaning to use an aqueous medium as the reaction medium for the cationic polymerization. In recent years, the cationic polymerization reaction using as the reaction medium an aqueous medium has aroused wide concern.

In 2006, Kostjuk S. V. and Ganachaud F. alleged in the thesis *Cationic Polymerization of Styrene in Solution and Aqueous Suspension Using $B(C_6F_5)_3$ as a Water-Tolerant Lewis Acid* (*Macromolecules*, vol. 39) that $B(C_6F_5)_3$ as a water-tolerant Lewis acid can successfully initiate the cationic polymerization of styrene in an aqueous phase medium. However, the resultant polystyrene has a lower molecular weight, the weight average molecular weight ($M_w$) thereof is about 3,000. Moreover, $B(C_6F_5)_3$ is expensive (about ¥322/g) and is used in a large amount, and the molar ratio of $B(C_6F_5)_3$ to monomers reaches 0.05.

In 2008, Kostjuk S. V., Radchenko A. V. and Ganachaud F. further mentioned in *Controlled Cationic Polymerization of Cyclopentadiene with $B(C_6F_5)_3$ as a Coinitiator in the Presence of Water* (*Journal of Polymer Science, Part A: Polymer Chemistry*, vol. 46) that $B(C_6F_5)_3$ may initiate the cationic polymerization of cyclopentadiene in an aqueous phase medium. However, the polymerization has a slow rate and needs to be conducted for scores of hours, and a conversion of less than 40% is just achieved. Moreover, only the polymer products having a low molecular weight (the $M_w$ thereof is less than 2,500) can be obtained.

Similarly, Radchenko A. V., Kostjuk S. V. and Vasilenko I. V., et al disclosed in *Controlled/living cationic polymerization of styrene with $BF_3 \cdot OEt_2$ as a coinitiator in the presence of water: Improvements and limitations* (*European Polymer Journal*, Vol. 43, 2007) a process for cationic polymerization by initiating styrene with $BF_3 \cdot OEt_2$ in an organic reaction medium system having a low water concentration, i.e. water content being lower than 0.11 mol/L, wherein the resultant polymer has a lower molecular weight (the $M_w$ thereof is less than 2,000). Along with the slight increase of the water content, the polymerization rate will be obviously lowered; the molecular weight will be obviously decreased; the molecular weight distribution will be broadened. When the water content reaches 1.6 mol/L, i.e. water volume percent in the reaction medium being about 3.1%, the polymerization almost does not occur.

JP 10130315 and JP11080221 disclose a catonic polymerization of monomers with high reactivity, e.g. isobutylvinyl ether, p-methoxystyrene by using the Lewis acid, e.g. yttrium trifluorosulfonate or ytterbium trifluorosulfonate as an coiniator. However, only the polymer products having a low molecular weight ($M_w$<10,000) can be obtained. Moreover, yttrium trifluorosulfonate is expensive (about ¥140/g) and is used in a large amount, and the molar ratio of yttrium trifluorosulfonate to monomers reaches 0.05.

WO2004094486A1 and U.S. Pat. No. 7,202,371 respectively disclose a process for cationic polymerization of isoolefins in an aqueous reaction medium, wherein chelated diborane (e.g. $C_6F_4[B(C_6F_5)_2]_2$) and cumyl chloride are used respectively as the coinitiator and the initiator for initiating the cationic polymerization of isobutene at −60° C. in an aqueous reaction medium or copolymerization of isobutene with a small amount of isoprene. However, the prepared polymers still have a low molecular weight, and the maximum $M_w$ is only $1.2 \times 10^5$, generally about $5 \times 10^4$, so that the polymers cannot be used as elastic materials. Moreover, the monomer polymerization conversion is also low. Among fourteen examples of cationic polymerization in an aqueous reaction medium listed in the present invention, the monomer polymerization conversion in twelve examples is lower than 50%. In addition, the chelated diborane compounds used in the process cannot be directly obtained by the commercial approaches. The chelated diborane compounds need to be prepared by a multi-step chemical reaction under the laboratory conditions, thereby increasing the complexity of the technological procedures. Moreover, the raw materials required for preparing such chelated diborane are expensive.

In conclusion, the prior art of cationic polymerization of vinyl monomer in the aqueous reaction medium is faced with many problems, such as high cost of initiating system, complex technological process, low polymerization efficiency, low molecular weight of polymer products and the like. Moreover, Lewis acids which have a high cost or are prepared specially are required as co-initiator. Thus the development of a new initiating system having a high activity, low cost, commercially obtainable raw materials and being easy and convenient to use in a polymerization process are the key points for solving the problems in cationic polymerization in the aqueous medium in the prior art, and can create conditions for simplifying the technological process, increasing the polymerization efficiency, synthesizing high molecular weight polymer products, reducing the cost and the like. However, the technologies and procedures of the cationic polymerization of the cationic-polymerizable monomers co-initiated directly by Lewis acid such as $AlCl_3$, $AlRCl_2$, $BF_3$, $TiCl_4$, $FeCl_3$, $SnCl_4$, $ZnCl_2$ and the like in the aqueous medium or even a reaction medium which is totally water have not been reported yet.

Contents of the Invention

One object of the present invention is to provide an initiating system for cationic polymerization of cationic-polymerizable monomers, and a process for cationic polymerization of cationic-polymerizable monomers by using the initiating system, thereby overcoming one or more disadvantages in the prior art. In particular, one object of the present invention is to provide an initiating system for cationic polymerization of cationic-polymerizable monomers in an aqueous reaction medium, and a process for cationic polymerization of cationic-polymerizable monomers by using the initiating system in an aqueous reaction medium.

The technical solutions of the present invention include:

Embodiment 1: An initiating system for initiating a cationic polymerization in an aqueous reaction medium, wherein the initiating system comprises an initiator, an additive, a Lewis acid and an optional diluent.

Embodiment 2: The initiating system according to Embodiment 1, wherein the initiator is selected from the compounds which can provide protons, or from the group consisting of the organic tertiary alkyl or aralkyl functional compounds which can provide cationogens, or from the group consisting of the adducts of hydrogen halide and monomers, or mixtures of these substances, e.g. from the group consisting of the compounds which can provide protons and/or of the adducts of hydrogen halide and monomers.

Embodiment 3: The initiating system according to Embodiment 1 or 2, wherein Lewis acid is selected from one or more compounds having the general formula $MX_n$ or $YR_{n-m}X_m$, or mixtures thereof, wherein M is B, Al, Sn, Ti, Fe, Sb or Zn; X is F, Cl or Br; n is 2, 3, 4 or 5; m is 1,2 or 3; Y is Al, Sn, Ti or Zn; R is selected from the group consisting of alkyl, aryl, aralkyl, alkylaryl optionally substituted by halo substituents, wherein alkyl or alkyl in the alkyl-containing group is preferably $C_1$-$C_{20}$ alkyl, e.g. $C_1$-$C_6$ alkyl; aryl or aryl in the aryl-containing group is phenyl or naphthyl.

Embodiment 4. The initiating system according to any of Embodiments 1-3, wherein the additive is selected from the group consisting of organic compounds containing one or more heteroatoms, such as, nitrogen, oxygen, sulfur and phosphor, e.g. organic compounds containing one or more heteroatoms containing oxygen, sulfur and phosphor.

Embodiment 5. The initiating system according to any of Embodiments 1-4, wherein the additive is selected from the group consisting of the compounds containing one or more groups of —O—, —CO—, —COO—, —CON—, —S—, —SO—, —OSO—, —P—, —PO—, —$PO_3$—, —$PO_4$— and —PS—.

Embodiment 6. The initiating system according to any of Embodiments 1-5, wherein the molar ratio of the initiator, additive and Lewis acid is $(5 \times 10^4$–$25)$: $(0.01$-$120)$:$1$, preferably $(8 \times 10^4$–$20)$: $(0.02$-$100)$:$1$.

Embodiment 7. A polymerization system for cationic polymerization in an aqueous reaction medium, wherein the polymerization system consists of an initiating system according to any of Embodiments 1-6, one or more cationic-polymerizable monomers, an aqueous reaction medium and an optional dispersant, wherein the initiating system is in-situ formed in the polymerization system or mixed with other ingredients of the polymerization system after its preparation.

Embodiment 8. The polymerization system according to Embodiment 7, wherein the aqueous reaction medium further contains water-soluble compounds, such as ionic compounds and/or alcohols.

Embodiment 9. A process for polymerizing cationic-polymerizable monomers in an aqueous reaction medium, which comprises the step of polymerizing the polymerization system according to Embodiment 7 or 8.

Embodiment 10. A polymer prepared by the process according to Embodiment 9.

DETAILED DESCRIPTION OF THE INVENTION

The present invention provides an initiating system for cationic polymerization of cationic-polymerizable monomers in an aqueous reaction medium.

The present invention provides a cationic polymerization system comprising the initiating system of the present invention, cationic-polymerizable monomers and aqueous reaction medium.

The present invention provides a polymerization process for cationic polymerization of cationic-polymerizable monomers in an aqueous reaction medium by using the initiating system of the present invention.

The present invention provides a polymer prepared by polymerizing cationic-polymerizable monomers in an aqueous reaction medium by means of the initiating system of the present invention.

The following specific disclosure of the present invention is suitable for each aspect of the invention above.

1. Initiating System

The initiating system of the present invention is an initiating system for initiating the cationic polymerization of cationic-polymerizable monomers in an aqueous reaction medium. The initiating system of the present invention comprises an initiator, Lewis acid, an additive and an optional diluent.

(1) Initiator

The initiator is selected from the group consisting of the compounds which can provide the cation source, specifically from the group consisting of the compounds which can provide protons, or from the group consisting of the organic tertiary alkyl or aralkyl functional compounds which can provide cationogens, or from the group consisting of the adducts of hydrogen halide and monomers, or mixtures of these substances, preferably from the group consisting of the compounds which can provide protons and/or of the adducts of hydrogen halide and monomers.

The compound which can provide protons is at least one selected from the group consisting of $H_2O$, hydrogen halide, protonic acids, carboxylic acids, alcohols and phenols. More specifically, the compound which can provide protons is one or more selected from the group consisting of $H_2O$, hydrogen halides, protonic acids, organic carboxylic acids containing $C_1$-$C_{14}$ alkyl, aryl $C_1$-$C_{14}$ alkyl or $C_1$-$C_{14}$ alkylaryl, phenol, $C_1$-$C_{14}$ alkyl mono-substituted phenol or multi-$C_1$-$C_{14}$ alky substituted phenol, alcohol containing $C_1$-$C_{14}$ alkyl and aryl $C_1$-$C_{14}$ alkyl. Said aryl or aryl in said aryl-containing group may be, e.g. phenyl or naphthyl.

In the present invention, water in the reaction medium may partially function as an initiator.

The adducts of hydrogen halide and monomers are preferably selected from the group consisting of the adducts of isobutene, styrene, α-methylstyrene, p-methylstyrene or vinyl ether with HCl, HBr or HI.

The organic tertiary alkyl or aralkyl functional compounds are one or more selected from the group consisting of esters having tertiary alkyl or aralkyl, alcohols having tertiary alkyl or aralkyl, ethers having tertiary alkyl or aralkyl, peroxides, epoxides or halides (e.g. chlorides), benzyl halides (e.g. benzyl chlorides) or benzyl halides (e.g. benzyl chlorides) substituted by one or more $C_1$-$C_{14}$ alkyl group.

The molar ratio of the initiator to the monomer is $(1.0 \times 10^{-6}$–$5.0 \times 10^{-1})$:1, preferably $(1.5 \times 10^{-6}$–$4.0 \times 10^{-1})$:1 or $(2 \times 10^{-6}$–$3.0 \times 10^{-1})$:1, more preferably $(2.2 \times 10^{-6}$–$2.0 \times 10^{-1})$:1 or $(2.4 \times 10^{-6}$–$1.5 \times 10^{-1})$:1.

(2) Lewis Acid

According to the present invention, Lewis acid is a metal halide or an organic metal halide.

According to the present invention, Lewis acid may be one selected from the group consisting of the substances having the general formula $MX_n$ or $YR_{n-m}X_m$, or mixtures thereof, wherein M is B, Al, Sn, Ti, Fe, Sb or Zn; X is F, Cl or Br; n is 2, 3, 4 or 5; m is 1, 2 or 3; Y is Al, Sn, Ti or Zn; R is selected from the group consisting of alkyl, aryl, aralkyl, alkylaryl optionally substituted by halo substituents, wherein alkyl or alkyl in the alkyl-containing group may be, e.g. $C_1$-$C_{20}$ alkyl, especially $C_1$-$C_6$ alkyl; aryl or aryl in the aryl-containing group may be, e.g. phenyl or naphthyl.

The $MX_n$-type compound is preferably one or more selected from the group consisting of $BF_3$, $BCl_3$, $AlCl_3$, $AlBr_3$, $SnCl_4$, $TiCl_4$, $TiBr_4$, $FeCl_3$, $SbCl_5$ and $ZnCl_2$; the $YR_{n-m}X_m$-type compound is preferably one or more selected from the group consisting of $Al(C_2H_5)Cl_2$, $Al(C_2H_5)_2Cl$, $Al(i$-$C_4H_9)Cl_2$, $Al(i$-$C_4H_9)_2Cl$, sesquiethyl aluminum chloride, sesquiisobutyl aluminum chloride, $Sn(C_2H_5)Cl_3$, $Sn(C_2H_5)_2Cl_2$, $Sn(C_2H_5)_3Cl$ and $Zn(C_2H_5)Cl$.

The molar ratio of the Lewis acid to the monomer is $(9.0 \times 10^{-5}$–$5.0 \times 10^{-1})$:1, preferably $(1.0 \times 10^{-4}$–$4.0 \times 10^{-1})$:1, more preferably $(1.5 \times 10^{-4}$–$3.5 \times 10^{-1})$:1, more preferably $(2.0 \times 10^{-4}$–$3.0 \times 10^{-1})$:1, more preferably $(2.5 \times 10^{-4}$–$2.5 \times 10^{-1})$:1.

(3) Additive

According to the present invention, said additive may be at least one organic compound containing nitrogen, oxygen, sulfur, phosphor atoms, and preferably have the general structural formula of R—X—Y.

The moiety R is selected from the group consisting of linear, branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy group, which is optionally substituted by halo or nitro substituent, preferably from the group consisting of linear or branched or cyclic $C_1$-$C_{12}$ alkyl, phenyl, phenyl $C_1$-$C_{12}$ alkyl, $C_1$-$C_{12}$ alkylphenyl, $C_1$-$C_{12}$ alkoxy, aryloxy or aryl $C_1$-$C_{12}$ alkoxy group, which is optionally substituted by halo or nitro substituent, wherein aryl or aryl in the aryl-containing group may be phenyl or naphthyl.

The moiety of X requires at least one of O, N, S or P atom, and the structure is preferably one selected from the group consisting of —O—, —N—, —CO—, —COO—, —CON—, —S—, —SO—, —OSO—, —P—, —PO—, —$PO_3$—, —$PO_4$— and —PS—, more preferably from the group consisting of —O—, —CO—, —COO—, —CON—, —SO—, —OSO—, —P—, —PO—, —$PO_3$—, —$PO_4$—, and —PS—.

The moiety of Y is selected from the group consisting of H, halo, linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which is optionally substituted by halo or nitro substituent, preferably from the group consisting of H, linear or branched or cyclic $C_1$-$C_{12}$ alkyl, phenyl, phenyl $C_1$-$C_{12}$ alkyl, $C_1$-$C_{12}$ alkylphenyl, $C_1$-$C_{12}$ alkoxy, aryloxy or aryl $C_1$-$C_{12}$ alkoxy, which is optionally substituted by halo or nitro substituent. R and Y, each is independent from the other, may be linked by the chemical bond so as to make the molecules form a ring. Said aryl or the aryl in the aryl-containing group may be phenyl or naphthyl. Said halo is preferably selected from the group consisting of chlorine and bromine.

More specifically, the additive having the structure of R—X—Y in the current compounds having the known structure comprises the following types of compounds:

(1) The oxygen-containing compound is preferably at least one of the compounds having the following structural formula: ethers having the general structural formula $R_1OR_2$, alcohols or phenols having the general structural formula $R_3OH$, ketones having the general structural formula $R_4COR_5$, or esters having the general structural formula $R_6COOR_7$, wherein $R_1$-$R_7$ is selected from the group consisting of same or different linear or branched or cyclic $C_1$-$C_{20}$ alkyl, aryl $C_1$-$C_{20}$ alkyl, aryl or $C_1$-$C_{20}$ alkylaryl, preferably $C_1$-$C_{12}$ alkyl, aryl $C_1$-$C_{12}$ alkyl, aryl or $C_1$-$C_{12}$ aralkyl, wherein aryl or the aryl in the aryl-containing group may be phenyl or naphthyl.

(2) The nitrogen-containing compound is preferably at least one of the compounds having the following structural formula: amines having the general structural formula $R_8R_9R_{10}N$, or amides having the general structural formula $R_{11}CONR_{12}R_{13}$, wherein $R_{13}$ is selected from the group consisting of same or different linear or branched or cyclic $C_1$-$C_{20}$ alkyl, aryl $C_1$-$C_{20}$ alkyl, aryl or $C_1$-$C_{20}$ alkylaryl, preferably same or different $C_1$-$C_{12}$ alkyl, aryl $C_1$-$C_{12}$ alkyl, aryl or $C_1$-$C_{12}$ alkylaryl; $R_8$-$R_{12}$ is selected from the group consisting of H, same or different linear or branched or cyclic $C_1$-$C_{20}$ alkyl, aryl $C_1$-$C_{20}$ alkyl, aryl or $C_1$-$C_{20}$ alkylaryl, preferably H, same or different $C_1$-$C_{12}$ alkyl, aryl $C_1$-$C_{12}$ alkyl, aryl or $C_1$-$C_{12}$ alkylaryl, wherein aryl or the aryl in the aryl-containing group may be phenyl or naphthyl.

(3) The sulfur-containing compound is preferably at least one of the substances having the following general formula: compounds of thioethers ($R_{14}$—S—$R_{15}$), sulfones ($R_{16}R_{17}SO_2$) and sulfoxides ($R_{18}R_{19}SO$) or derivatives thereof, wherein $R_{14}$-$R_{19}$ respectively and independently represent linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, or $R_{14}$ and $R_{15}$, $R_{16}$ and $R_{17}$ or $R_{18}$ and $R_{19}$ are bonded to form $C_4$-$C_{20}$alkylidene radical or cycloalkylidene, preferably $C_1$-$C_{12}$ alkyl, aryl, aryl $C_1$-$C_{12}$ alkyl, $C_1$-$C_{12}$ alkylaryl, $C_1$-$C_{12}$ alkoxy, aryloxy or aryl $C_1$-$C_{12}$ alkoxy, which are optionally substituted by halo or nitro substituent, or $R_{14}$ and $R_{15}$, $R_{16}$ and $R_{17}$ or $R_{18}$ and $R_{19}$ are bonded to form $C_4$-$C_{12}$ alkylidene radical or cycloalkylidene, wherein aryl or the aryl in the aryl-containing group may be phenyl or naphthyl.

(4) The phosphor-containing compound is preferably at least one of the substances having the following general formula: phosphines ($R_{20}PR_{21}R_{22}$), phosphine oxides ($R_{23}R_{24}R_{25}PO$), phosphates ($R_{26}R_{27}R_{28}PO_4$), phosphite ($R_{29}R_{30}R_{31}PO_3$), wherein $R_{20}$, $R_{23}$, $R_{26}$ and $R_{29}$ may represent H, halo, linear or branched or cyclic $C_1$-$C_{20}$ alkyl, aryl, aryl $C_1$-$C_{20}$ alkyl or $C_1$-$C_{20}$ alkylaryl, which are optionally substituted by halo or nitro substituent, preferably H, halo, $C_1$-$C_{12}$ alkyl, aryl, aryl $C_1$-$C_{12}$ alkyl, $C_1$-$C_{12}$ alkylaryl, which are optionally substituted by halo or nitro substituent; $R_{21}$, $R_{22}$, $R_{24}$, $R_{25}$, $R_{27}$ and $R_{28}$ respectively and independently represent linear or branched or cyclic $C_1$-$C_{20}$ alkyl, aryl, aryl $C_1$-$C_{20}$ alkyl, $C_1$-$C_{20}$ alkylaryl, which are optionally substituted by halo or nitro substituent, preferably $C_1$-$C_{12}$ alkyl, aryl, aryl $C_1$-$C_{12}$ alkyl, $C_1$-$C_{12}$ alkylaryl, which are optionally substituted by halo or nitro substituent, wherein aryl or the aryl in the aryl-containing group may be phenyl or naphthyl; said halo is preferably selected from the group consisting of chlorine and bromine.

(5) The sulfur- and phosphor-containing compound is preferably at least one of the compounds having the general structural formula $R_{30}PSR_{31}R_{32}$ and derivatives thereof, wherein $R_{30}$, $R_{31}$ and $R_{32}$ respectively and independently represent H, halo, linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, preferably H, halo, $C_1$-$C_{12}$ alkyl, aryl, aryl $C_1$-$C_{12}$ alkyl, $C_1$-$C_{12}$ alkylaryl, $C_1$-$C_{12}$ alkoxy, aryloxy or aryl $C_1$-$C_{12}$ alkoxy, which are optionally substituted by halo or nitro substituent, wherein aryl or the aryl in the aryl-containing group may be phenyl or naphthyl; said halo is preferably selected from the group consisting of chlorine and bromine.

In one embodiment, said additive may be a compound of the structural formula $R_1$—X—Y, or mixtures thereof, wherein $R_1$ is selected from the group consisting of $C_1$-$C_{20}$ alkyl, aryl $C_1$-$C_{20}$ alkyl, aryl, $C_1$-$C_{20}$ alkylaryl, halo-substituted $C_1$-$C_{20}$ alkyl, halo-substituted aryl $C_1$-$C_{20}$ alkyl, substituted aryl or halo-substituted $C_1$-$C_{20}$ alkylaryl, preferably from the group consisting of $C_1$-$C_8$ alkyl, phenyl $C_1$-$C_8$ alkyl, phenyl, $C_1$-$C_8$ alkylphenyl, chlorine substituted $C_1$-$C_8$ alkyl, chlorine substituted phenyl $C_1$-$C_8$ alkyl, chlorine substituted phenyl or chlorine substituted $C_1$-$C_8$ alkylphenyl, wherein aryl or aryl in the aryl-containing group may be phenyl or naphthyl.

The structure of X at least comprises one of O and N atom, preferably one of —O—, —N—, —CO—, —COO— and —CON—, more preferably one of —O—, —CO—, —COO— and —CON—.

Y is selected from the group consisting of H, $C_1$-$C_{20}$ alkyl, aryl $C_1$-$C_{20}$ alkyl, aryl, $C_1$-$C_{20}$ alkylaryl, halo-substituted $C_1$-$C_{20}$ alkyl, halo-substituted aryl $C_1$-$C_{20}$ alkyl, substituted aryl or halo-substituted $C_1$-$C_{20}$ alkylaryl, preferably from the group consisting of H, $C_1$-$C_8$ alkyl, phenyl $C_1$-$C_8$ alkyl, phenyl or $C_1$-$C_8$ alkylphenyl, chlorine-substituted $C_1$-$C_8$ alkyl, chlorine-substituted phenyl $C_1$-$C_8$ alkyl, chlorine-substituted phenyl and chlorine-substituted $C_1$-$C_8$ alkylphenyl, wherein aryl or aryl in the aryl-containing group may be phenyl or naphthyl.

Among the above additives, alcohol compounds may be selected from the group consisting of methanol, ethanol, propanol, butanol, amyl alcohol, hexanol, enanthol, octanol, benzyl alcohol, phenylethyl alcohol, phenylpropanol, phenylbutyl alcohol, methyl benzyl alcohol; ether compounds may be selected from the group consisting of ethyl ether, propyl ether, butyl ether, amyl ether, hexyl ether, heptyl ether, octyl ether, anisole, phenyl propyl ether, phenyl butyl ether, diphenyl ether, xylene either, dibenzyl ether, dichlorobenzene ether and dichloromethylbenzene ether. Ketone compound may be selected from the group consisting of acetone, butanone, pentanone, hexanone, heptanone, octanone, acetophenone, phenylethylketone, phenyl propyl ketone, valerophenone, phenylamylketone and phenylhexylketone. Ester compounds may be selected from the group consisting of methyl acetate, ethyl acetate, ethyl monochloroacetate, ethyl dichloroacetate, ethyl trichloroacetate, propyl acetate, butyl acetate, methyl propionate, ethyl propionate, propyl propionate, butyl propionate, methyl acrylate, ethyl acrylate, propyl acrylate, butyl acrylate, amyl acrylate, methyl butyrate, ethyl butyrate, propyl butyrate, butyl butyrate, methyl methacrylate, ethyl methacrylate, propyl methacrylate, butyl methacrylate, amyl methacrylate, methyl benzoate, ethyl benzoate, propyl benzoate, butyl benzoate, amyl benzoate, hexyl benzoate, heptyl benzoate, octyl benzoate, dimethyl phthalate, diethyl phthalate, dipropyl phthalate, diallyl phthalate, dibutyl phthalate, dioctyl phthalate, dimethyl terephthalate, diethyl terephthalate, dipropyl terephthalate, and dibutyl terephthalate.

Among the above additives, amine compounds may be selected from the group consisting of diethylamine, triethylamine, diphenylamine, amylamine, diethylmethylamine, N,N-dimethylhexylamine, N-methylbutylamine, N,N-dimethylbutylatnine, N-ethylbutylamine, hexylamine, N-methylhexylamine, N-butylpropylamine, heptyl amine, 2-aminoheptane, 3-aminoheptane, N,N-dipropylethylamine, N,N-dimethylhexylamine, octylamine, aniline, benzylamine, N-methylaniline, phenylbutylamine, N-butylaniline, N,N-diethylaniline, 2,6-diethylaniline, and triphenylamine Amide compounds may be selected from the group consisting of N,N-dimethylformamide, N,N-dimethylacetamide, N,N-diethylformamide and N,N-diethylacetamide.

In another embodiment, the additive may be one or more selected from the group consisting of sulfur-containing organic compounds, phosphor-containing organic compounds and sulfur- and phosphor-containing organic compounds.

More specifically, the sulfur-containing organic compound is preferably at least one selected from the group consisting of compounds of thioethers $R_1$—S—$R_2$, sulfones $R_3R_4SO_2$ and sulfoxides $R_5R_6SO$, or derivatives thereof, wherein $R_1$-$R_6$ respectively and independently linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, or $R_1$-$R_6$ are bonded with functional groups to form $C_4$-$C_{20}$ cycloalkylidene radical or aryl-substituted alkylidene radical, wherein the aryl or the aryl in the aryl-containing group may be phenyl or naphthyl.

Preferably, thioether compounds may be selected from the group consisting of diethyl sulfide, dipropyl sulfide, diisopropyl sulfide, dibutyl sulfide, diamyl sulfide, dihexyl sulfide, diheptyl sulfide, diphenyl sulfide, dinaphthyl sulfide, dianthryl sulfide, dibenzyl sulfide, xylyl sulfide, dichlorobenzene sulfide, dinitrophenyl sulfide, methylethyl sulfide, methylpropyl sulfide, methylbutyl sulfide, methylphenyl sulfide, ethylphenyl sulfide, propylphenyl sulfide, butylphenyl sulfide, cyclobutyl sulfide, cyclopentyl sulfide, cyclohexyl sulfide, cycloheptyl sulfide, cyclododecyl sulfide. More preferably, thioether compounds may be selected from the group consisting of dipropyl sulfide, dibutyl sulfide, diphenyl sulfide, dinaphthyl sulfide, dianthryl sulfide, and dibenzyl sulfide.

Preferably, sulfoxide compounds may be selected from the group consisting of dimethyl sulfoxide, diethyl sulfoxide, dipropyl sulfoxide, dibutyl sulfoxide, diamyl sulfoxide, dihexyl sulfoxide, diheptyl sulfoxide, diphenyl sulfoxide, dinaphthyl sulfoxide, dianthryl sulfoxide, dibenzyl sulfoxide, xylyl sulfoxide, dichlorobenzene sulfoxide, dinitrophenyl sulfoxide, methylethyl sulfoxide, methylpropyl sulfoxide, methylbutyl sulfoxide, methylphenyl sulfoxide, ethylphenyl sulfoxide, propylphenyl sulfoxide, butylphenyl sulfoxide, cyclobutyl sulfoxide, cyclopentyl sulfoxide, cyclohexyl sulfoxide, cycloheptyl sulfoxide, isobutyldodecyl sulfoxide. More preferably, sulfoxide compounds may be selected from the group consisting of dimethyl sulfoxide, dipropyl sulfoxide, dibutyl sulfoxide, diphenyl sulfoxide, dinaphthyl sulfoxide, dianthryl sulfoxide, dibenzyl sulfoxide, xylyl sulfoxide, and dichlorobenzene sulfoxide Preferably, sulfone compounds may be selected from the group consisting of dimethyl sulfone, diethyl sulfone, dipropyl sulfone, dibutyl sulfone, diamyl sulfone, dihexyl sulfone, diheptyl sulfone, diphenyl sulfone, dinaphthyl sulfone, dianthryl sulfone, dibenzyl sulfone, xylyl sulfone, dichlorobenzene sulfone, dinitrophenyl sulfone, methylethyl sulfone, methylpropyl sulfone, methylbutyl sulfone, methylphenyl sulfone, ethylphenyl sulfone, propylphenyl sulfone, butylphenyl sulfone, cyclobutyl sulfone, cyclopentyl sulfone, cyclohexyl sulfone, cycloheptyl sulfone, cyclododecyl sulfone. More preferably, sulfone compounds may be selected from the group consisting of dimethyl sulfone, dipropyl sulfone, dibutyl sulfone, diphenyl sulfone, dinaphthyl sulfone, dibenzyl sulfone, xylyl sulfone, dichlorobenzene sulfone and cyclobutyl sulfone.

The phosphor-containing organic compound is at least one of the organic phosphines $R_7PR_8R_9$, organic phosphine oxides $R_{10}R_{11}R_{12}P=O$, organic phosphates $R_{13}R_{14}R_{15}PO_4$, organic phosphites $R_{16}R_{17}R_{18}PO_3$, or derivatives thereof, wherein $R_7, R_{10}, R_{13}$ and $R_{16}$ may represent H, halo, linear or branched or cyclic $C_1$-$C_{20}$ alkyl, aryl, aryl $C_1$-$C_{20}$ alkyl or $C_1$-$C_{20}$ alkylaryl, which are optionally substituted by halo or nitro substituent; $R_8, R_9, R_{11}, R_{12}, R_{14}, R_{15}, R_{17}$ and $R_{18}$ respectively and independent represent linear or branched or cyclic $C_1$-$C_{20}$ alkyl, aryl, aryl $C_1$-$C_{20}$ alkyl or $C_1$-$C_{20}$ alkylaryl, which are optionally substituted by halo or nitro substituent; wherein aryl or the aryl in the aryl-containing group may be phenyl or naphthyl; said halo is preferably selected from the group consisting of chlorine and bromine.

Preferably, phosphine compounds may be selected from the group consisting of triethyl phosphine, tripropyl phosphine, tributyl phosphine, triamyl phosphine, trihexyl phosphine, triheptyl phosphine, triphenyl phosphine, trinaphthyl phosphine, trianthryl phosphine, tribenzyl phosphine, trimethylphenyl phosphine, trichlorophenyl phosphine, trinitrophenyl phosphine, dimethyl phosphine, diethyl phosphine, dipropyl phosphine, dibutyl phosphine, diamyl phosphine, dihexyl phosphine, diheptyl phosphine, diphenyl phosphine, diphenylphosphine chloride, dinaphthyl phosphine, dianduyi phosphine, dibenzyl phosphine, xylyl phosphine, methyldiphenyl phosphine, ethyldiphenyl phosphine, propyl diphenyl phosphine, butyldiphenyl phosphine, tributoxyl phosphine, triphenoxyl phosphine. More preferably, phosphine compounds may be selected from the group consisting of tripropyl phosphine, tributyl phosphine, triphenyl phosphine, trinaphthyl phosphine, tribenzyl phosphine, trimethylphenyl phosphine and trichlorophenyl phosphine Preferably, phosphine oxide compounds may be selected from the group consisting of trimethyl phosphine oxide, triethyl phosphine oxide, tripropyl phosphine oxide, tributyl phosphine oxide, triamyl phosphine oxide, trihexyl phosphine oxide, triheptyl phosphine oxide, triphenyl phosphine oxide, trinaphthyl phosphine oxide, trianthryl phosphine oxide, tribenzyl phosphine oxide, trimethylphenyl phosphine oxide, trichlorophenyl phosphine oxide, trinitrophenyl phosphine oxide, dimethyl phosphine oxide, dimethylchloro phosphine oxide, diethyl phosphine oxide, dipropyl phosphine oxide, dibutyl phosphine oxide, diamyl phosphine oxide, dihexyl phosphine oxide, diheptyl phosphine oxide, diphenyl phosphine oxide, dinaphthyl phosphine oxide, dianthryl phosphine oxide, dibenzyl phosphine oxide, dimethylphenyl phosphine oxide, dichlorophenyl phosphine oxide, dinitrophenyl phosphine oxide, methyldiphenyl phosphine oxide, ethyldiphenyl phosphine oxide, propyldiphenyl phosphine oxide, butyldiphenyl phosphine oxide. More preferably, phosphine oxide compounds may be selected from the group consisting of trimethyl phosphine oxide, tripropyl phosphine oxide, tributyl phosphine oxide, triphenyl phosphine oxide, trinaphthyl phosphine oxide, trianthryl phosphine oxide, tribenzyl phosphine oxide, trimethylphenyl phosphine oxide, trichlorophenyl phosphine oxide, diphenyl phosphine oxide and diphenylchloro phosphine oxide.

Preferably, phosphate compounds may be selected from the group consisting of trimethyl phosphate, triethyl phosphate, tripropyl phosphate, tributyl phosphate, triamyl phosphate, trihexyl phosphate, triheptyl phosphate, triphenyl phosphate, trinaphthyl phosphate, trianthryl phosphate, tribenzyl phosphate, trimethylphenyl phosphate, trichlorophenyl phosphate, trinitrophenyl phosphate, dimethyl phosphate, dimethyl chlorophosphate, diethyl phosphate, dipropyl phosphate, dibutyl phosphate, diamyl phosphate, dihexyl phosphate, diheptyl phosphate, diphenyl phosphate, dinaphthyl phosphate, dianthryl phosphate, dibenzyl phosphate, dimethylphenyl phosphate, dichlorophenyl phosphate, dinitrophenyl phosphate, methyldiphenyl phosphate, ethyldiphenyl phosphate, propyldiphenyl phosphate, butyldiphenyl phosphate More preferably, phosphate compounds may be selected from the group consisting of trimethyl phosphate, triethyl phosphate, tripropyl phosphate, tributyl phosphate, triphenyl phosphate and tribenzyl phosphate.

Preferably, phosphite compounds may be selected from the group consisting of trimethyl phosphite, triethyl phosphite, tripropyl phosphite, tributyl phosphite, triamyl phosphite, trihexyl phosphite, triheptyl phosphite, triphenyl phosphite, trinaphthyl phosphite, tribenzyl phosphite, trimethylphenyl phosphite, trichlorophenyl phosphite, trinitrophenyl phosphite, dimethyl phosphite, diethyl phosphite, dipropyl phosphite, dibutyl phosphite, diamyl phosphite, dihexyl phosphite, diheptyl phosphite, diphenyl phosphite, dibenzyl phosphite, dimethylphenyl phosphite, dichlorophenyl phosphite, dinitrophenyl phosphite, methyldiphenyl phosphite, ethyldiphenyl phosphite, propyldiphenyl phosphite, butyldiphenyl phosphite More preferably, phosphite compounds may be selected from the group consisting of trimethyl phosphite, triethyl phosphite, tripropyl phosphite, tributyl phosphite, triphenyl phosphite and tribenzyl phosphite.

The sulfur- and phosphor-containing organic compound is at least one of the substances having the general structural formula $R_{19}PSR_{20}R_{21}$, and derivatives thereof, wherein $R_{19}$, $R_{20}$ and $R_{21}$ respectively and independent represent H, halo, same or different linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy group, which are optionally substituted by halo or nitro substituent, wherein aryl or the aryl in the aryl-containing group may be phenyl or naphthyl; said halo is preferably selected from the group consisting of chlorine and bromine.

Preferably, sulfur- and phosphor-containing organic compound may be selected from the group consisting of trimethyl phosphorous sulfide, triethyl phosphorous sulfide, triethoxyl phosphorous sulfide, tripropyl phosphorous sulfide, tributyl phosphorous sulfide, tributoxyl phosphorous sulfide, triphenyl phosphorous sulfide, triphenoxyl phosphorous sulfide, methyldiphenyl phosphorous sulfide, ethyldiphenyl phosphorous sulfide, trinaphthyl phosphorous sulfide, trianthryl phosphorous sulfide, tribenzyl phosphorous sulfide, tritolyl phosphorous sulfide, trichlorophenyl phosphorous sulfide, trinitrophenyl phosphorous sulfide, dimethyl phosphorous sulfide, diethyl phosphorous sulfide, dimethyl thiophosphoryl chloride. More preferably, sulfur- and phosphor-containing organic compound may be selected from the group consisting of trimethyl phosphorous sulfide, triethyl phosphorous sulfide and triphenyl phosphorous sulfide.

The additive may be the mixture of many compounds above.

The molar ratio of the additive to the monomer is $(1\times10^{-4}$–$5.0\times10^{-1}):1$, preferably $(2.0\times10^{-4}$–$4.5\times10^{-1}):1$ or $(2.5\times10^{-4}$–$4.0\times10^{-1}):1$, preferably $(2.8\times10^{-3}$–$3.0\times10^{-1}):1$, more preferably $(3.3\times10^{-3}$–$2.8\times10^{-1}):1$.

In the initiating system according to the present invention, the molar ratio of initiator, additive and Lewis acid is $(5\times10^{-4}$–$25):(0.01$–$120):1$, preferable $(8\times10^{-4}$–$20):(0.02$–$100):1$.

(4) Optional Diluent

The diluent may be any organic or inorganic solvent capable of mixing with other ingredients in the initiating system of the present invention to form a solution or dispersion. The organic solvent is preferred, and is one selected from the group consisting of alkanes, cycloalkanes, aromatics and halogenated hydrocarbons, or mixtures thereof. Halogenated hydrocarbons are, e.g. halogenated alkanes, halogenated cycloalkanes or halogenated aromatics. Aromatics are, e.g. phenyl and mono-or multi-substituted alkylbenzene.

In one embodiment, the diluent may be the organic solvent in the aqueous reaction medium as stated in this invention.

The initiating system can be in-situ formed in the polymerization system, or pre-prepared before the polymerization. The initiating system may be prepared by various methods and is convenient to use. For example, the initiator, additive and Lewis acid are mixed according to different feeding manners and then directly used, or used after the reaction lasts a period of time; or the initiator is firstly mixed with Lewis acid, and then with the additive, and then directly used, or used after the mixing for a period of time; or the additive is mixed with Lewis acid and then directly used, or used in combination with the initiator after the reaction lasts a period of time. The initiator may be added into the mixture of the additive and Lewis acid, or the mixture of monomers and the reaction medium, to in-situ form an initiating system; or a part of the initiator is added into the mixture of monomers/reaction medium; and the remaining initiator is mixed with the additive and Lewis acid, and directly used or used after the mixing lasts a period of time The temperature of mixing or reaction of the ingredients above may range from −90° C. to 50° C. The initiating system may be used with the diluent, or directly used under the condition of no diluent. Optional diluent may be added into other ingredients of the initiating system, or any mixture of these ingredients at any time. In addition, the initiating system has the advantage of storage stability, and even maintains the activity after being deposited for several days or several months.

In the polymerization process of the present invention, the initiator, Lewis acid or additive may be directly used, or used after being formulated into the mixture solution with the above-mentioned diluents.

2. Cationic-Polymerizable Monomers

The cationic-polymerizable monomers are preferably the cationic-polymerizable vinyl compounds preferably selected from the group consisting of alkyl-substituted, aryl-substituted or electron-donating group-substituted vinyl compounds. For example, the vinyl compounds are one or more selected from the group consisting of $C_3$-$C_{12}$ olefins or cycloolefins, $C_4$-$C_{12}$ diolefins or cyclodiolefins, styrenes or derivatives thereof, and vinyl ethers.

The preferred vinyl monomers are selected from the group consisting of propylene, n-butene, isobutene, 2-methyl-butene, amylene, 2-methyl-amylene, 3-methyl-amylene, hexene, heptene, octene, decene, 2,3-dimethylbutadiene, 2,4-dimethyl-1,3-butadiene, pinene, cyclopropene, cyclobutene, cyclopentene, cyclohexene, cyclooctene, butadiene, 1,3-pentadiene, isoprene, cyclopentadiene, cyclohexadiene, norborene, styrene, α-methylstyrene, p-methylstyrene, p-chloromethylstyrene, p-methoxystyrene, p-t-butylstyrene, p-t-butoxylstyrene, p-vinylstyrene, indene, methylvinyl ether, n-butylvinyl ether, isobutylvinyl ether, methoxyethylvinyl ether, ethoxyethylvinyl ether and t-butoxylethylvinyl ether.

Said vinyl monomers can be used directly or after being formulated with the diluent into the solution. Said diluent may be the organic solvent in the reaction medium, which is one or more selected from the group consisting of alkanes, cycloalkanes, aromatics or halogenated hydrocarbons, and may be the mixed solvents consisting of one or more selected from the group consisting of saturated hydrocarbons (e.g. butane, pentane, hexane, heptane, octane, petroleum ether, cyclohexane, methylcyclohexane) or halogenated hydrocarbons (e.g. methane chloride, dichloromethane, ethane chloride, dichloroethane, propane chloride, butane chloride, trifluoroethane, tetrafluoroethane).

The polymerization reaction of the present invention includes the homopolymerization and copolymerization of the above monomers. In the polymerization system, the vinyl monomers have a concentration of 0.4 mol/L-7.0 mol/L.

The present invention solves the problems of low polymerization degree in the prior art which use complex co-initiator to initiate cationic polymerization of vinyl monomers in organic solvent containing some water or an aqueous phase. In the present invention, vinyl monomers is cationic-homopolymerized or cationic-copolymerized into homopolymer or copolymer of vinyl monomers.

3. Aqueous Reaction Medium

The aqueous reaction medium of the present invention is a mixed reaction medium of an organic solvent and water, or a reaction medium in which water is prominant or a reaction medium which is totally water. In the aqueous reaction medium, water is preferably from 3.5% to 100%, more preferably from 5% to 100% by volume in the reaction medium.

The organic solvent is one or more olefins, alkanes, cycloalkanes, aromatics or halogenated hydrocarbons, or mixtures thereof. The olefins may be, e.g. ethylene. Halogenated hydrocarbons may be, for example, halogenated alkanes, halogenated cycloalkanes or halogenated aromatics. Aromatics may be, for example, benzene, mono-substituted or poly-substituted alkylbenzene.

Preferably, the organic solvent is at least one selected from the group consisting of linear or branched or cyclic $C_1$-$C_{20}$ olefins, alkanes, cycloalkanes, aromatics and halogenated hydrocarbons, or mixtures thereof, preferably one or more selected from the group consisting of $C_2$-$C_3$ olefins, $C_1$-$C_{12}$ alkanes, cycloalkanes, aromatics and halogenated hydrocarbons. More specifically, the olefins are, e.g. ethylene; the alkanes or cycloalkanes are preferably selected from the group consisting of ethane, propane, butane, pentane, hexane, heptane, octane, nonane, decane, petroleum ether, cyclohexane, methylcyclohexane, and isomers thereof. The aromatics are preferably selected from the group consisting of benzene, toluene, xylene, trimethylbenzene, ethylbenzene, diethylbenzene, triethylbenzene, propyl benzene, and isopropyl benzene. The halogenated hydrocarbons are selected from the group consisting of methane chloride, dichloromethane, trichloromethane, chloroethane, dichloroethane, trichloroethane, chloropropane, chlorobutane, fluoromethane, difluoromethane, trifluoromethane, tetrafluoromethane, fluoroethane, difluoroethane, trifluoroethane, tetrafluoroethane, pentafluoroethane, hexafluoroethane, fluoropropane, difluoropropane, trifluoropropane, tetrafluoropropane, pentafluoropropane, hexafluoropropane, and fluorobutanes.

In addition, the addition of the organic solvent will be advantageous to decrease the polymer concentration in the polymerization reaction and increase the effect of dispersion, mass and heat transfer.

Preferably, the volume ratio of water in the aqueous reaction medium to cationic-polymerizable monomers, e.g. vinyl monomers, is (0.03-25):1, preferably (0.04-23.0):1, further preferably (0.05-21):1, more preferably (0.05-19):1.

In the polymerization system of the present invention, the volume ratio of the organic solvent to monomers may be (0-12):1, preferably (0-10):1.

The medium may contain additional water-soluble compounds. The water-soluble compounds are one or more selected from the group consisting of ionic compounds, such as alkaline metal salt $I_A P$ or ammonium salts, inorganic protonic acid, organic acid and the like, or alcohols, wherein $I_A$ is an alkali metal of lithium, sodium or potassium; P is chlorine, bromine or an acid radical. Said alkaline metal salts or ammonium salt compounds are one or more preferably selected from the group consisting of sodium chloride, lithium chloride, potassium chloride, potassium bromide, sodium dodecyl sulfate, sodium dodecyl sulfonate, ammonium trimethylhexadecyl bromide. The inorganic protonic acid is one or more preferably selected from sulfuric acid, hydrochloric acid and fluoboric acid. The organic acid is one or more preferably selected from $C_1$-$C_5$ saturated or unsaturated acids, e.g. formic acid and acetic acid. The alcohol is one or more preferably selected from $C_1$-$C_5$ saturated or unsaturated alcohols, including mono-alcohols or polyols, e.g. methanol, ethanol, propanol, ethylene glycol, propylene glycol and glycine. The mass ratio of the water-soluble compound to monomers is (0-8.0):1, preferably (0-6.5):1. For example, the mass ratio of the alkaline metal salt or ammonium salt in the reaction medium, or protonic acid or mixtures thereof to cation-polymerizable monomers, e.g. vinyl monomers, is (0-6.2):1. Such compound may reduce the solidifying point of the reaction medium, enabling the reaction to be conducted at low temperature.

4. Dispersant

The present process enables the polymerization system to exhibit a heterogeneous polymerization system in a homogeneously dispersed state, so as to increase the reaction efficiency and product quality, to obtain the polymer products having a high conversion and a high molecular weight and to break through the current technical difficulties.

In the cationic polymerization process of the present invention, the polymerization system comprises a reaction medium, monomers, an initiator, a Lewis acid, an additive, an optional diluent and an optional dispersant, wherein monomers are cationic-homopolymerized or copolymerized to obtain the corresponding homopolymers or copolymers.

The dispersant is at least one of amphiphilic compounds.

The dispersant of the present invention is an amphiphilic compound having the general structure formula W—O, wherein W is hydrophilic group selected from the one or more hydroxyl, carboxyl, alkoxyl, ester groups, ammonium ion, sulfate ion, and benzene sulfonate ion; O is an lipophilic group of $C_6$-$C_{20}$ alkyl, aryl, aryl $C_6$-$C_{20}$ alkyl or $C_6$-$C_{20}$ alkylaryl, which are optionally substituted by halo or nitro. If any, the mass ratio of the dispersant to monomers is (0-0.4):1, preferably $(1.0 \times 10^{-4} - 3.0 \times 10^{-1})$:1 or preferably $(2.0 \times 10^{-4} - 2.0 \times 10^{-1})$:1.

In one embodiment, the preferred dispersant is at least one from alcohols, acids, alkylbenzene sulfonates, fatty acid ester sulfonates, alkyl sulfates, fatty alcohol polyoxyethylene ether, alkyl phenol polyoxyethylene ether, fatty acid polyoxyethylene ether, polyoxyethylene alkyl amine, sorbitan fatty acid ester and epoxy ethanol adducts thereof, and alkyl ammonium halide. More preferred examples include at least one from dodecyl trimethyl ammonium bromide, octylphenol polyoxyethylene ether, hexadecyl alcohol, oleic acid, sorbitan monostearate, sorbitan oleate, and polyoxyethylene sorbitol monolaurate.

In the practical application, the amount of the dispersant depends on the type of the dispersant, the type and amount of the additive, the type and amount of Lewis acid, the type and amount of monomers, the type and amount of organic solvents, and water content in the reaction medium. As for the same dispersant and the determined polymerization reaction system, if the amount of the dispersant is too low, it will not have the effect of homogeneous dispersion and be difficult in stabilizing the polymerization reaction system; if the amount of the dispersant is too high, the cost will be increased so as to increase the post-treatment procedures and the difficulty of isolation and purification of products while there is better dispersion effect. According to the present invention, the cationic polymerization of monomers can be achieved in an aqueous medium by using the mentioned dispersants, and the polymerization system exhibits a homogeneously dispersed effect, so as to be advantageous to increase the heat and mass transfer and simultaneously to increase the homogeneity of temperature distribution in the polymerization system, in particular to increase the polymerization conversion and the molecular weight of the product. These effects cannot be achieved by the prior art.

5. Polymerization Process

The present invention provides a process of cationic polymerization of monomers induced with the aforesaid initiating system in the aqueous reaction medium.

In the polymerization process, the polymerization system comprises a reaction medium, monomers, an initiating system and an optional dispersant. According to the present invention, cationic-polymerizable monomers are homopolymerized or copolymerized by said initiating system in an aqueous reaction medium to obtain the corresponding homopolymers or copolymers. The polymerization process is conducted by a batch-wise polymerization method, a semi-continuous polymerization method or a continuous polymerization method.

The process of the present invention can be used for the cationic polymerization under the conditions of the conventional reactor conditions. Taking the batch-wise polymerization method as an example, the polymerization comprises the following steps in turn:

(1) respectively adding into the polymerization reactor the reaction medium and monomers in said ratio, and mixing them, wherein said monomers can be directly added into the polymerization system, or added after being formulated into the solution with the diluent;

(2) adding the initiating system containing the initiator, additive and Lewis acid in said ratio into said reactor, wherein the initiating system is in-situ formed or pre-prepared; the initiating system can be used after being formulated into the solution with the diluent, or directly used under the conditions of no diluent;

(3) polymerizing at a temperature ranging from −100° C. to 50° C., preferably from −85° C. to 35° C. for 0.1-120 min;

(4) adding an excess amount of alkaline substances as the terminating agent into the reaction system, to terminate the polymerization reaction.

The alkaline substances are the aqueous solution of NaOH, KOH, alcohols or ammonia. Those skilled in the art can determine the amount thereof according to the actual requirements to terminate the reaction. More preferred concentration thereof is 1-5 mass %.

After termination of the polymerization, the reaction system passes through the alkaline solution, is rinsed with water, and flash evaporated in turn, which are repeated many times to separate out the residual monomers, additives, reaction medium, Lewis acid and the like to obtain a polymer. The resultant polymer is vacuum-dried at 40° C. to obtain a dried polymer product.

The polymerization system constructed according to the method of the present invention is homogeneously and stably dispersed, and not easy to agglomerate. The monomer conversion, the molecular weight and molecular weight distribution of the polymers can be adjusted within a large scope. The polymerization proceeds rapidly with a high reaction efficiency, and the conversion may achieve as high as 80% within 1 h. The weight average molecular weight of the polymer product of the present invention may reach about $1 \times 10^6$ (the unit of molecular weight in the present invention is g/mol,), and the molecular weight distribution may be as narrow as 1.7. Under the same polymerization conditions, the weight average molecular weight of the isobutene polymers of the present invention may reach $1 \times 10^6$, which is notably superior to the prior art.

The present polymerization process with the dispersant, which is different from the prior art, not only can achieve the homogeneously dispersed polymerization system having fine particles with a particle size ranging from 1 μm to 3,000 μm, but also is advantageous to increase the mass and heat transfer in the polymerization system, or even can achieve the effect of increasing monomer conversion and molecular weight of the polymer products, and of narrowing the molecular weight distribution. The process of the present invention can enable the polymerization system to show a homogeneously dispersed state, even under the circumstance of increasing the polymer concentration or polymerization temperature, and can achieve the object of increasing the production efficiency and reducing the energy consumption simultaneously. The process of the present invention can also increase the production efficiency of the equipment and reduce the cost by further increasing the initial monomer concentration and the monomer conversion during polymerization. In particular, as compared with the currently industrial technological polymerization process at a temperature of $-100°$ C., the present invention can achieve polyisobutenes having a molecular weight as high as $6 \times 10^5$ or higher at a temperature of $-60°$ C., thereby achieving the object of saving energy and reducing consumption.

The present invention provides an economical and easy-to-conduct process capable of initiating the cationic polymerization of vinyl monomers in a reaction medium containing water with the initiating system in-situ produced or pre-prepared from an initiator, a common Lewis acid and a suitable additive, wherein the initiator may be additionally added, or water is used as the initiator (without adding any additional initiator having other structures). By controlling the polymerization conditions, the polymer products having a low, medium or high molecular weight can be synthesized. In particular, the present invention can also increase the molecular weight of the polymer products, so as to overcome the technical difficulty of low molecular weight of the polymer products via cationic polymerization in the aqueous phase.

In addition, even if the cationic copolymerization of isobutene and isoprene are conducted in an aqueous phase medium under the circumstance that the isoprene content is as high as 18% in the monomer mixing proportion, the present can also achieve a high monomer conversion. The isoprene content in the copolymer may reach 18% which is close to the monomer feeding ratio, almost without gel formation, which cannot be achieved by the prior art.

The polymerization process of the present invention not only can simplify the polymerization process and procedures, but also can reduce the cost. Water is used as the reaction medium, so as to be environmentally-friendly and have an appreciable commercial application prospect.

The present invention has the following prominent advantages:
1. Breaking through both the theoretical and technological bottlenecks that it is difficult to use the conventional Lewis acid for the cationic polymerization in an aqueous reaction medium or even the reaction medium which is totally water;
2. Constructing an initiating system having the advantages of high-activity, low price, stable properties and being easy to use, capable of initiating the cationic polymerization of vinyl monomers in an aqueous reaction medium with high initiation efficiency, having a high polymerization efficiency, capable of greatly increasing the molecular weight of the polymer products, wherein the weight average molecular weight ($M_w$) may reach as high as $1 \times 10^6$ which is almost 8-20 times higher than the prior art;
3. The aqueous medium can achieve better dispersion effect and high heat transfer efficiency of the aqueous medium during polymerization, so as to be advantageous to increasing the homogeneity of temperature distribution in the polymerization system, controlling the product quality, reducing the energy consumption, saving the energy, decreasing the discharge and reducing the production cost.

Embodiments

The present application is illustrated by the following examples, but the scopes or implementing methods thereof are not limited by the examples.

In the following examples, the microstructure parameters of the polymer products are measured by the common technical means in the art, i.e. measuring the number average molecular weight, weight average molecular weight, peak molecular weight and molecular weight distribution of the product with Gel Permeation Chromatograph (GPC).The molecular weight is represented by the weight average molecular weight ($M_w$); the molecular weight distribution is represented by the distribution index ($M_w/M_n$); the measurement is conducted at a temperature of 25° C., wherein tetrahydrofuran is used as the mobile phase having a flow rate of 1 mL/min. XSZ-HS$_3$-type phase contrast microscope produced by Chongqing Optical Instrument Factory is used to observe microscopic morphology of the polymerization system. The microstructure and composition content of the polymers are measured by $^1$H-NMR, wherein CDCl$_3$ is used as the solvent; and tetramethylsilane (TMS) is the internal standard.

EXAMPLE 1

At a temperature of $-50°$ C., 40 mL of isobutene (IB)/dichloromethane solution and 2 mL of an aqueous solution containing 20% LiCl and 1% NaCl were added into the polymerization reactor, so that the water content in the reaction medium was 7% and the IB concentration in the reaction system was 2.8 mol/L. After homogeneously mixing, an initiating system consisting of water, orthocresol, dichloroisobutyl aluminum and AlCl$_3$ was used to initiate the polymerization, wherein the molar ratio of orthocresol to IB was $1.3 \times 10^4$:1; the molar ratio of dichloroisobutyl aluminum to LB was $1.0 \times 10^{-3}$:1; the molar ratio of AlCl$_3$ to IB is $1.3 \times 10^4$:1. After 10 min of the reaction, the NaOH/ethanol solution was added to terminate the reaction, wherein NaOH had a mass percent of 5%. The solvent, initiating system and unreacted monomers were removed, and then the product was washed several times with an alkaline solution and water in turn, vacuum-dried at 40° C. to a constant weight. The yield of polymer was 69%; $M_w$ was $5.4 \times 10^3$; and $M_w/M_n$ was 4.1.

EXAMPLE 2

At a temperature of −80° C., 7 mL of m and methane chloride solution and 30 mL of an aqueous solution containing 23% LiCl and 1.2% NaCl were added into the polymerization reactor, so that the water content in the reaction medium was 85% and the IB concentration in the polymerization system was 0.6 mol/L. After homogeneously mixing, an initiating system consisting of water, 1,1-dimethylbenzyl alcohol (shortened as cumyl alcohol), anisole and $AlCl_3$ was used to initiate the polymerization, wherein the molar ratio of cumyl alcohol to IB was $5 \times 10^{-4}:1$; the molar ratio of anisole to IB was $3.1 \times 10^{-2}:1$; the molar ratio of $AlCl_3$ to IB was $2.1 \times 10^{-2}:1$. After 10 min of the polymerization, the methods for termination and post-treatment were the same as those in Example 1. The yield of polymer was 66%; $M_w$ was $1.4 \times 10^5$; $M_w/M_n$ was 3.9.

EXAMPLE 3

At a temperature of −60° C., 30 mL of IB/dichloromethane/cyclohexane solution (cyclohexane/dichloromethane=0.07) and 20 mL of an aqueous solution containing 23% LiCl and 1.2% NaCl and 0.07 g of trimethyl cetyl ammonium bromide were added into the polymerization reactor, so that the water content in the reaction medium was 47% and the IB concentration in the polymerization system was 1.8 mol/L. After homogeneously mixing, an initiating system consisting of water, methyl-t-butyl ether, triphenylamine, methyl benzoate and $AlCl_3$ was used to initiate the polymerization, wherein the molar ratio of methyl-t-butyl ether to IB was $5 \times 10^{-4}:1$; the molar ratio of triphenylamine to IB was $5 \times 10^{-3}:1$; the molar ratio of methyl benzoate to IB was $3 \times 10^{-4}:1$; the molar ratio of $AlCl_3$ to IB was $1.0 \times 10^{-2}:1$. After 1 min of the polymerization, the methods for termination and post-treatment were the same as those in Example 1. The yield of polymer was 100%; $M_w$, was $8.0 \times 10^4$.

EXAMPLE 4

At a temperature of −80° C., 20 mL of IB/dichloromethane solution and 20 mL of an aqueous solution containing 23% LiCl and 1.2% NaCl were added into the polymerization reactor, so that the water content in the reaction medium was 57% and the IB concentration in the polymerization system was 1.5 mol/L. After homogeneous mixing, an initiating system consisting of water, ethyl acetate and $AlCl_3$ was used to initiate the polymerization, wherein the molar ratio of ethyl acetate to IB was $1.5 \times 10^{-2}:1$; the molar ratio of $AlCl_3$ to IB was $1.5 \times 10^{-2}:1$. After 10 min of the polymerization, the methods for termination and post-treatment were the same as those in Example 1. The yield of polymer was 31%; $M_w$ was $5.4 \times 10^5$.

EXAMPLE 5

At a temperature of −20° C., 10 mL of n-butylvinyl ether and 10 mL of an aqueous solution containing 20% LiCl and 1% NaCl were added into the polymerization reactor, so that the water content in the reaction medium was 100%. After homogeneously mixing, an initiating system consisting of water, diphenyl ether/$AlCl_3$ was used to initiate the polymerization, wherein the molar ratio of diphenyl ether to monomers was $3.0 \times 10^{-2}:1$; the molar ratio of $AlCl_3$ to n-butylvinyl ether was $3.0 \times 10^{-2}:1$. After 10 min of the polymerization, the methods for termination and post-treatment were the same as those in Example 1. The yield of polymer was 31%; $M_w$, was $1.2 \times 10^4$; $M_w/M_n$ was 2.2.

EXAMPLE 6

At a temperature of −80° C., 30 mL of IB/dichloromethane/methylcyclohexane solution (methylcyclohexane/dichloromethane=0.1) and 20 mL of an aqueous solution containing 23% LiCl and 1.2% NaCl were added into the polymerization reactor, so that the water content in the reaction medium was 47% and the IB concentration in the polymerization system was 1.8 mol/L. After homogeneous mixing, an initiating system consisting of water, 2,4,4-trimethyl-2-chloro-pentane, diphenyl ether, $ZnCl_2$ and $AlCl_3$ was used to initiate the polymerization, wherein the molar ratio of 2,4,4-trimethyl-2-chloro-pentane to IB was $1.0 \times 10^{-5}:1$; the molar ratio of diphenyl ether to IB was 0.22:1; the molar ratio of $ZnCl_2$ to IB was $2.2 \times 10^{-4}:1$; the molar ratio of $AlCl_3$ to IB was $5.5 \times 10:1$. After 10 min of the polymerization, the methods for termination and post-treatment were the same as those in Example 1. The yield of polymer was 100%; $M_w$ was $1.5 \times 10^5$; $M_w/M_n$, was 5.4.

EXAMPLE 7

At a temperature of −60° C., 30 mL of IB/dichloromethane/isopentane solution (isopentane/dichloromethane=0.12) and 3 mL of 34% sulphuric acid solution were added into the polymerization reactor, so that the water content in the reaction medium was 12% and the IB concentration in the polymerization system was 2.7 mol/L. After homogeneous mixing, an initiating system consisting of water, acetone, acetophenone and $BF_3$ was used to initiate the polymerization, wherein the molar ratio of acetophenone to IB was $2.1 \times 10^{-3}:1$; the molar ratio of acetone to IB was $1.2 \times 10^{-4}:1$; the molar ratio of $BF_3$ to IB was $2.2 \times 10^{-3}:1$. After 10 min of the polymerization, the methods for termination and post-treatment were the same as those in Example 1. The yield of polymer was 12%; $M_w$ was $3.7 \times 10^4$.

EXAMPLE 8

At a temperature of −80° C., 32 mL of IB/isoprene/dichloromethane solution and 20 mL of an aqueous salt solution containing 23% LiCl and 1.2% NaCl were added into the polymerization reactor, so that the water content in the reaction medium was 47%, the IB concentration in the polymerization system was 1.7 mol/L and the isoprene concentration in the polymerization system was 0.4 mol/L. After homogeneous mixing, an initiating system consisting of water, diphenyl ether and $AlCl_3$ was used to initiate the polymerization, wherein the molar ratio of diphenyl ether to IB was $8.8 \times 10^{-2}:1$; the molar ratio of $AlCl_3$ to IB was $1.1 \times 10^{-2}:1$. After 10 min of the polymerization, the methods for termination and post-treatment were the same as those in Example 1. The yield of copolymer was 60%; $M_w$, was $2.4 \times 10^4$; $M_w/M_n$ was 3.0, wherein the IP binding capacity in the copolymer was 18 mol %.

EXAMPLE 9

At a temperature of −15° C., 15 mL of n-butylvinyl ether/dichloromethane solution and 15 mL of an aqueous solution containing 15% LiCl, 0.1% sodium dodecyl sulfate and 2% NaCl were added into the polymerization reactor, so that the water content in the reaction medium was 60%; and the n-butylvinyl ether concentration in the polymerization system was 1.3 mol/L. After homogeneously mixing, an initiating system consisting of water, isooctanol and $FeCl_3$ was used to initiate the polymerization, wherein the molar ratio of isooctanol to n-butylvinyl ether was $2.8 \times 10^{-2}:1$; and the molar ratio of $FeCl_3$ to n-butylvinyl ether was $2.3 \times 10^4:1$. After 10 min of the polymerization, the methods for termination and post-treatment were the same as those in Example 1. The yield of polymer was 30%; $M_w$ was $1.6 \times 10^3$; $M_w/M_n$ was 1.7.

EXAMPLE 10

At a temperature of −60° C., 30 mL of IB/dichloromethane solution and 20 mL of an aqueous solution containing 23% LiCl and 1.2% NaCl were added into the polymerization reactor, so that the water content in the reaction medium was 47%; and the IB concentration in the polymerization system was 1.8 mol/L. After homogeneous mixing, an initiating system consisting of water, hydrogen chloride, diphenyl ether, dichlorodibutyl tin and $TiCl_4$ was used to initiate the polymerization, wherein the molar ratio of diphenyl ether to IB was $8.0 \times 10^{-2}:1$; the molar ratio of dichlorodibutyl tin to IB was $5.0 \times 10:1$; the molar ratio of $TiCl_4$ to IB was $1.0 \times 10^{-2}:1$. After 10 min of the polymerization, the methods for termination and post-treatment were the same as those in Example 1. The yield of polymer was 81%; $M_w$ was $1.5 \times 10^5$; $M_w/M_n$ was 5.4.

EXAMPLE 11

At a temperature of 0° C., $CH_2Cl_2$, water, HCl, triphenyl phosphine and $AlCl_3$ were mixed to produce an initiating system, wherein the molar ratio of water:HCl:triphenyl phosphine:$AlCl_3$ was $2 \times 10^{-2}:1 \times 10^{-2}:0.94:1$.

At a temperature of −60° C., water, 5 g of LiCl, 0.26 g of NaCl, n-hexane and isobutene (IB) were added in a total volume of 40 ml into the polymerization reactor, wherein the aqueous phase in the reaction medium had a volume percent of 57%; and the IB concentration in the reaction system was 1.5 mol/L. While stirring, the aforesaid initiating system was added to initiate the polymerization to form a homogeneously dispersion system and to enable the molar ratio of $AlCl_3$ to m to be $1.0 \times 10^{-2}:1$. After 2 min of the polymerization, the methods for termination and post-treatment were the same as those in Example 1. The yield of polymer was 55%; $M_w$ was $4.8 \times 10^5$; $M_w/M_n$ was 4.3.

EXAMPLE 12

At a temperature of 0° C., triphenyl phosphine was mixed with $AlCl_3$. The mixed solution of water, 1-chlorophenylethane, $CH_2Cl_2$ and n-hexane was added to produce an initiating system, wherein the molar ratio of water: 1-chlorophenylethane:triphenyl phosphine:$AlCl_3$ was $2.9 \times 10^{-2}:5.7 \times 10^-:1.1:1$.

At a temperature of −20° C., styrene, water, 2.5 g of LiCl, 0.13 g of NaCl were added in a total volume of 20 ml into the polymerization reactor, wherein the reaction medium was totally water; the styrene concentration in the reaction system was 4.4 mol/L. While stirring, the aforesaid initiating system was added to initiate the polymerization to enable the molar ratio of $AlCl_3$ to styrene to be $7 \times 10^{-3}:1$. After 1 min of the polymerization, the methods for termination and post-treatment were the same as those in Example 1. The yield of polymer was 7%; $M_w$ was $6.9 \times 10^4$; $M_w/M_n$ was 2.6.

EXAMPLE 13

At a temperature of −40° C., $CH_2Cl_2$, water and triphenyl phosphine oxide were mixed; then $TiCl_4$ was added and mixed to produce an initiating system, wherein the molar ratio of water:triphenyl phosphine oxide:$TiCl_4$ was $2 \times 10^{-3}:5 \times 10^{-2}:1$.

At a temperature of −60° C., n-hexane, isobutene, 0.25 g of LiCl, 0.013 g of NaCl and water were added in a total volume of 21 ml into the polymerization reactor, wherein water in the reaction medium had a volume percent of 6%; and the IB concentration in the reaction system was 5.7 mol/L. While stirring, the aforesaid initiating system was added to initiate the polymerization to enable the molar ratio of $TiCl_4$ to IB to be $0.2:1$. After 10 min of the polymerization, the methods for termination and post-treatment were the same as those in Example 1. The yield of polymer was 61%; $M_w$ was $6.7 \times 10^4$; $M_w/M_n$ was 8.2.

EXAMPLE 14

At a temperature of −20° C., $CH_2Cl_2$, water, triphenyl phosphine oxide and $BF_3$ were mixed; then ethyl zinc chloride was added to produce an initiating system, wherein the molar ratio of water:ethyl zinc chloride: triphenyl phosphine oxide:$BF_3$ was $6 \times 10^4:2 \times 10^{-2}:1.15:1$.

At a temperature of −20° C., water, 0.51 g of LiCl, 0.026 g of NaCl, n-hexane and isobutene were added in a total volume of 22 ml into the polymerization reactor, wherein water in the reaction medium had a volume percent of 12%; and the IB concentration in the reaction system was 2.7 mol/L. After homogeneous mixing, the aforesaid initiating system was added to initiate the polymerization to enable the molar ratio of $BF_3$ to IB to be $5 \times 10^{-3}:1$. After 10 min of the polymerization, the methods for termination and post-treatment were the same as those in Example 1. The yield of polymer was 33%; $M_w$ was $5.6 \times 10^4$; $M_w/M_n$ was 3.4.

EXAMPLE 15

At a temperature of −30° C., water, HCl and triphenyl phosphate were mixed; then $AlCl_3$ was added to produce an initiating system, wherein the molar ratio of water:HCl:triphenyl phosphate:$AlCl_3$ was $6 \times 10^{-2}:2 \times 10^{-2}:1:1$.

At a temperature of −60° C., water, 5 g of LiCl, 0.26 g of NaCl, isobutene, isoprene (IP) and n-hexane were added in a total volume of 42 ml into the polymerization reactor, wherein water in the reaction medium had a volume percent of 55%; the IB concentration in the. reaction system was 1.4 mol/L; and the IP concentration in the reaction system was 0.03 mol/L. The aforesaid initiating system was added to initiate the polymerization to enable the molar ratio of $AlCl_3$ to IB to be $5 \times 10^{-3}:1$. After 5 min of the polymerization, the methods for termination and post-treatment were the same as those in Example 1. The yield of copolymer was 32%; $M_w$ was $2.0 \times 10^5$; $M_w/M_n$ was 2.2; the IP content was 2.5 mol %.

EXAMPLE 16

At a temperature of 10° C., water and triethyl phosphate were homogeneously mixed;

then $AlCl_3$ and butyl tin chloride were added to produce an initiating system, wherein the molar ratio of water:butyl tin chloride:triethyl phosphate: $AlCl_3$ was $4 \times 10^{-2}:4 \times 10^{-3}:1:1$.

The polymerization monomers, reaction medium and polymerization temperature were the same as those in Example 11, except that the aforesaid initiating system was added to initiate the polymerization reaction, to enable the molar ratio of $AlCl_3$ to IB to be $5\times10^{-1}$:1. After 5 min of the polymerization, the methods for termination and post-treatment were the same as those in Example 1. The yield of polyisobutene was 35%; $M_w$ was $1.0\times10^6$; $M_w/M_n$ was 2.5.

EXAMPLE 17

At a temperature of 10° C., water, dichlorodibutyl tin, dimethyl sulfoxide and $AlCl_3$ were mixed to produce an initiating system, wherein the molar ratio of water: dichlorodibutyl tin: dimethyl sulfoxide:$AlCl_3$ was $0.1:2\times10^{-2}$:1:1.

At a temperature of −60° C., water, 5 g of LiCl, 0.26 g of NaCl, n-hexane, dichloromethane and isobutene were added in a total volume of 40 ml into the polymerization reactor, wherein water in the reaction medium had a volume percent of 57% and the IB concentration in the reaction system was 1.5 mol/L. The aforesaid initiating system was added to initiate the polymerization to enable the molar ratio of $AlCl_3$ to IB to be $5\times10^{-3}$:1. After 5 min of the polymerization, the methods for termination and post-treatment were the same as those in Example 1. The yield of polyisobutene was 89%; $M_w$ was $5.0\times10^5$; $M_w/M_n$ was 3.0.

EXAMPLE 18

The polymerization monomers, reaction medium and polymerization temperature were the same as those in Example 11, and an initiating system containing the mixtures of the adducts of isobutene and hydrogen chloride, diphenyl sulfoxide and $AlCl_3$ to initiate the polymerization, wherein the molar ratios of the adducts of isobutene and hydrogen chloride to $AlCl_3$ and of diphenyl sulfoxide to $AlCl_3$ are respectively 0.58 and 1.0; the molar ratio of $AlCl_3$ to isobutene was $1\times10^{-2}$:1. After 5 min of the polymerization, the methods for termination and post-treatment were the same as those in Example 1. The yield of polyisobutene was 83%; $M_w$ was $2.0\times10^5$; $M_w/M_n$ was 4.4.

EXAMPLE 19

At a temperature of 0° C., water, diphenyl sulfoxide and $AlCl_3$ were mixed, and tributyl phosphite was added to produce an initiating system, wherein the molar ratio of water: tributyl phosphite:diphenyl sulfoxide:$AlCl_3$ was $0.2:2\times10^{-2}$:1:1.

At a temperature of −60° C., 5 g of LiCl, 0.26 g of NaCl, water, n-hexane, isobutene and p-methylstyrene (MSt) were added in a total volume of 42 ml into the polymerization reactor, wherein the aqueous phase in the reaction medium had a volume percent of 48%; the IB concentration in the reaction system was 1.4 mol/L; and the MSt concentration was 0.4 mol/L. The aforesaid initiating system was added to initiate the polymerization to enable the molar ratio of $AlCl_3$ to isobutene to be $1\times10^{-2}$:1. After 2 min of the polymerization, the methods for termination and post-treatment were the same as those in Example 1. The yield of copolymer was 58%; $M_w$ was $1.1\times10^5$; $M_w/M_n$ was 6.3; the MSt content in the copolymer has a mass percent of 61%.

EXAMPLE 20

At a temperature of 10° C., water, dimethyl sulfoether and $AlCl_3$ were mixed to produce an initiating system, wherein the molar ratio of water:dimethyl sulfoether:$AlCl_3$ was $2.2\times10^{-3}$:0.5:1.

The polymerization monomers, reaction medium and polymerization temperature were the same as those in Example 11. The aforesaid initiating system was added to initiate the polymerization to enable the molar ratio of $AlCl_3$ to IB to be $1\times10^{-2}$:1. After 10 min of the polymerization, the methods for termination and post-treatment were the same as those in Example 1. The yield of polymer was 24%; $M_w$, was $1.8\times10^5$; $M_w/M_n$ was 3.8.

EXAMPLE 21

At a temperature of 0° C., hexane, $CH_2Cl_2$, water, triphenyl phosphorous sulfide and $AlCl_3$ were mixed for standby, wherein the molar ratio of water:triphenyl phosphorous sulfide:$AlCl_3$ was $6\times10^{-3}$:0.7:1.

At a temperature of −60° C., water, 5 g of LiCl, 0.26 g of NaCl, di-t-butyl-p-cumyl peroxide, 0.1 g of sorbitan monooleate and isobutene were added in a total volume of 35 ml into the polymerization reactor, wherein the aqueous phase in the reaction medium had a volume percent of 100%; the isobutene concentration in the reaction system was 5 mol/L. The aforesaid initiating system was added to initiate the polymerization to enable the molar ratio of di-t-butyl-p-cumyl peroxide to $AlCl_3$ to be $3.4\times10^{-4}$:1, and the molar ratio of $AlCl_3$ to isobutene to be $6.4\times10^{-3}$:1. After 1 h of the polymerization, the methods for termination and post-treatment were the same as those in Example 1. The yield of polymer was 65%; $M_w$ was $6.3\times10^5$; $M_w/M_n$ was 5.0.

EXAMPLE 22

At a temperature of −10° C., $CH_2Cl_2$, $CH_3Cl$, water, diphenyl ether, p-dicumyl acetate and $AlCl_3$ were mixed to produce an initiating system, wherein the molar ratio of water:p-dicumyl acetate:diphenyl ether:$AlCl_3$ was $7.4\times10^{-3}:1\times10^{-4}$:1: 1.

At a temperature of −60° C., water, 5 g of LiCl, 0.26 g of NaCl, isobutene (IB), 0.1 g of sorbitan monooleate and 0.005 g of sodium dodecyl sulfate were added in a total volume of 30 ml into the polymerization reactor, wherein water in the reaction medium had a volume percent of 100%; and the IB concentration in the reaction system was 3.9 mol/L. While stirring, the aforesaid initiating system was added to initiate the polymerization so as to enable the molar ratio of $AlCl_3$ to IB to be $3.8\times10^{-4}$:1 The polymerization system exhibited a milk-white homogeneously dispersed state. After 2 min of the polymerization, the methods for termination and post-treatment were the same as those in Example 1. The yield of polymer was 24%; $M_w$ was $2.1\times10^5$; $M_w/M_n$ was 3.4.

EXAMPLE 23

At a temperature of 32° C., water, diphenyl ether and $AlCl_3$ were mixed; and then the adducts (1-chloroethylbenzene) of hydrogen chloride and styrene were added to produce an initiating system, wherein the molar ratio of water:1-chloroethylbenzen: diphenyl ether:$AlCl_3$ was $8.3\times10^{-3}:2.7\times10^{-3}$:8: 1.

At a temperature of 5° C., water, 20 mL of deionized water, 10 mL of styrene (St) and 0.5 mL oleic acid were added into the polymerization reactor, wherein water in the reaction medium was in an amount of 100%. While stirring, the aforesaid initiating system deposited for 7 days was added to initiate the polymerization so as to enable the molar ratio of $AlCl_3$ to IB to be 0.018:1. The polymerization system exhibited a homogeneously dispersed state. After 5 min of the polymerization, the methods for termination and post-treatment were the same as those in Example 1. The yield of polymer was 10%; $M_w$ was $2 \times 10^3$; $M_w/M_n$ was 2.2.

EXAMPLE 24

At a temperature of −40° C., $CH_2Cl_2$, hydrogen chloride, water, N,N-dimethyl acetamide and $AlCl_3$ were mixed; and then a hexane solution of dichloroisobutyl aluminum was added to produce an initiating system, wherein the molar ratio of water:HCl:N,N-dimethyl acetamide:dichloroisobutyl aluminum:$AlCl_3$ was $1 \times 10^{-2}:1.5 \times 10^{-1}:0.7:5 \times 10^{-2}:1$.

At a temperature of −80° C., 48 wt. % of $HBF_4$ aqueous solution, n-hexane, isobutene, p-methylstyrene (MSt), 0.18 g of sorbitan monooleate and 0.02 g of polyoxyethylene (20) sorbitan monolaurate were added in a total volume of 41 mL into the polymerization reactor, wherein the aqueous phase medium in the reaction medium had a volume percent of 31%; the IB concentration was 2.3 mol/L; and [MSt]=0.2 mol/L. While stirring, the aforesaid initiating system was added to initiate the polymerization so as to enable the molar ratio of $AlCl_3$ to IB to be $1.0 \times 10^{-2}:1$. The polymerization system exhibited a homogeneously dispersed state. After 0.2 min of the polymerization, the methods for termination and post-treatment were the same as those in Example 1. The yield of polymer was 43%; $M_w$ was $1.8 \times 10^4$; $M_w/M_n$ was 4.1; the MSt content in the copolymer was 26% by mass.

EXAMPLE 25

At a temperature of −60° C., $CH_2Cl_2$, water and $AlCl_3$ were mixed; and then orthocresol and phthalic ether were added to produce an initiating system, wherein the molar ratio of water:orthocresol:phthalic ether:$AlCl_3$ was $3 \times 10^{-2}:3 \times 10^{-2}:0.8:1$.

At a temperature of −60° C., water, 3.8 g of LiCl, 0.2 g of NaCl, 0.2 g of sorbitan monooleate, 0.01 g of cetyl trimethyl ammonium bromide and isobutene were added in a total volume of 30 mL into the polymerization reactor, wherein water medium in the reaction medium had a volume percent of 100% and the IB concentration was 5.8 mol/L. While stirring, the aforesaid initiating system was added to initiate the polymerization so as to enable the molar ratio of $AlCl_3$ to IB to be $5 \times 10^{-3}:1$. The polymerization system exhibited a homogeneously dispersed state. After 1 min of the polymerization, the methods for termination and post-treatment were the same as those in Example 1. The yield of polymer was 48%; $M_w$ was $1.9 \times 10^5$; $M_w/M_n$ was 3.6.

EXAMPLE 26

At a temperature of −10° C., hydrogen chloride, water and diphenyl ether were mixed; and then $AlCl_3$ was added to produce an initiating system, wherein the molar ratio of water:HCl:diphenyl ether:$AlCl_3$ was $2.5 \times 10^{-2}:1.5 \times 10^{-2}:4:1$.

At a temperature of −60° C., 5 g of LiCl, 0.26 g of NaCl, water, 0.2 g of sorbitan monooleate, 0.01 g of cetyl trimethyl ammonium bromide, toluene and isobutene were added in a total volume of 50 mL into the polymerization reactor, wherein water medium in the reaction medium had a volume percent of 50% and the IB concentration was 2.3 mol/L. While stirring, the aforesaid initiating system was added to initiate the polymerization so as to enable the molar ratio of $AlCl_3$ to IB to be $1.0 \times 10^{-2}:1$. The polymerization system exhibited a homogeneously dispersed state. After 2 min of the polymerization, the methods for termination and post-treatment were the same as those in Example 1. The yield of polymer was 46%; $M_w$ was $2.6 \times 10^5$; $M_w/M_n$ was 9.2.

EXAMPLE 27

At a temperature of 25° C., water, diphenyl ether and $AlCl_3$ were mixed for standby, wherein the molar ratio of water:diphenyl ether:$AlCl_3$ was $2 \times 10^{-2}:4:1$.

At a temperature of −60° C., water, adducts of hydrogen chloride and isobutene, 7.6 g of LiCl, 0.4 g of NaCl, isobutene, n-hexane, dichloromethane, 0.2 g of cetyl trimethyl ammonium bromide and 0.01 g of sorbitan monooleate were added in a total volume of 60 mL into the polymerization reactor, wherein the aqueous phase medium in the reaction medium had a volume percent of 57%; and the IB concentration was 1 mol/L in the polymerization system. While stirring, the above mixed solution was added to initiate the polymerization, wherein the molar ratio of adducts of hydrogen chloride and isobutene to $AlCl_3$ was $1.0 \times 10^{-2}:1$; the molar ratio of $AlCl_3$ to IB was $1.0 \times 10^{-2}:1$. The polymerization system exhibited a homogeneously dispersed state. After 2 min of the polymerization, the methods for termination and post-treatment were the same as those in Example 1. The yield of polymer was 14%; $M_w$ was $4.2 \times 10^5$; $M_w/M_n$ was 5.8.

EXAMPLE 28

At a temperature of 0° C., chlorobutane, water, diphenyl ether, $AlCl_3$ and dichlorobutyl tin were mixed to produce an initiating system, wherein the molar ratio of water:diphenyl ether:dichlorobutyl tin:$AlCl_3$ was $1.5 \times 10^{-2}:4:2.2 \times 10^{-2}:1$.

At a temperature of −60° C., water, 7.6 g of LiCl, 0.4 g of NaCl, isobutene, n-hexane and 0.2 g of polyglycoloctylphenyl ether were added in a total volume of 60 mL into the polymerization reactor, wherein the aqueous phase medium in the reaction medium had a volume percent of 57% and the IB concentration was 1.5 mol/L in the polymerization system. While stirring, the aforesaid initiating system was added to initiate the polymerization to enable the molar ratio of $AlCl_3$ to IB was $1.0 \times 10^{-2}:1$. The polymerization system exhibited a homogeneously dispersed state. After 1 min of the polymerization, the methods for termination and post-treatment were the same as those in Example 1. The yield of polymer was 15%; $M_w$ was $4.7 \times 10^5$; $M_w/M_n$ was 3.1.

EXAMPLE 29

At a temperature of −40° C., $CH_3Cl$, water, diphenyl ether and $AlCl_3$ were mixed, and then the mixed solution of ethyl zinc chloride and hexane was added to produce an initiating system, wherein the molar ratio of water:diphenyl ether:dichlorobutyl tin:$AlCl_3$ was $1.5 \times 10^{-2}:4:3 \times 10^{-3}:1$.

At a temperature of −60° C., water, 7.6 g of LiCl, 0.4 g of NaCl, 0.2 g of hexadecyltrimethyl ammonium chloride, 0.02 g of polyglycoloctylphenyl ether, isobutene, n-hexane and dichloromethane were added in a total volume of 60 mL into the polymerization reactor, wherein water in the reaction medium had a volume percent of 57%; the volume ratio of n-hexane to dichloromethane was 3:2; and the IB concentration was 1.5 mol/L in the reaction system. While stirring, the aforesaid initiating system was added to initiate the polymerization to enable the molar ratio of $AlCl_3$ to IB was $1.0 \times 10^{-2}:1$. The polymerization system exhibited a homogeneously dispersed state. After 5 min of the polymerization, the methods for termination and post-treatment were the same as those in Example 1. The yield of polymer was 30%; $M_w$ was $4.2 \times 10^5$; $M_w/M_n$ was 4.9.

EXAMPLE 30

At a temperature of 0° C., water, diphenyl ether and $AlCl_3$ were mixed to produce an initiating system, wherein the molar ratio of water:diphenyl ether:$AlCl_3$ was $1.5 \times 10^{-2}$:4:1.

At a temperature of −40° C., an aqueous solution having an ethylene glycol mass percent of 68 wt. %, isobutene, isooctane and 0.2 g of sorbitan monooleate were added in a total volume of 57 mL into the polymerization reactor, wherein water in the reaction medium had a volume percent of 22%; and the IB concentration was 1.6 mol/L in the reaction system. While stirring, the aforesaid initiating system was added to initiate the polymerization to enable the molar ratio of $AlCl_3$ to IB was $1.0 \times 10^{-2}$:1. The polymerization system exhibited a homogeneously dispersed state. After 10 min of the polymerization, the methods for termination and post-treatment were the same as those in Example 1. The yield of polymer was 62%; $M_w$ was $2.2 \times 10^5$; $M_w/M_n$ was 3.3.

EXAMPLE 31

At a temperature of −40° C., $CH_2Cl_2$, water, diphenyl ether and $BF_3$ were mixed, and then $AlCl_3$ was added to produce an initiating system, wherein the molar ratio of water:diphenyl ether:$BF_3$:$AlCl_3$ was $1 \times 10^{-2}$:4:$1 \times 10^{-2}$:1.

At a temperature of −60° C., petroleum ether (having a boiling range of 30-60° C.), isobutene, 3 g of LiCl, 0.16 g of NaCl, water and 0.2 g of sorbitan monooleate were added in a total volume of 57 mL into the polymerization reactor, wherein the aqueous medium in the reaction medium had a volume percent of 22%; and the IB concentration was 1.6 mol/L in the reaction system. While stirring, the aforesaid initiating system was added to initiate the polymerization to enable the molar ratio of $AlCl_3$ to IB was $1.0 \times 10^{-2}$:1. The polymerization system exhibited a homogeneously dispersed state. After 1 h of the polymerization, the methods for termination and post-treatment were the same as those in Example 1. The yield of polymer was 55%; $M_w$, was $5.6 \times 10^5$; $M_w/M_n$ was 3.9.

EXAMPLE 32

At a temperature of 0° C., water, diphenyl ether and $AlCl_3$ were mixed to produce an initiating system, wherein the molar ratio of water:diphenyl ether:$AlCl_3$ was $1.0 \times 10^{-2}$:8:1.

At a temperature of −60° C., water, 7.6 g of LiCl, 0.4 g of NaCl, 0.2 g of hexadecyl trimethyl ammonium bromide, 0.39 g of hexadecanol, n-hexane, dichloromethane and isobutene were added in a total volume of 60 mL into the polymerization reactor, wherein the aqueous medium in the reaction medium had a volume percent of 57% and the IB concentration was 1.5 mol/L in the reaction system. While stirring, the aforesaid initiating system was added to initiate the polymerization to enable the molar ratio of $AlCl_3$ to IB was $1.0 \times 10^{-2}$:1. The polymerization system exhibited a homogeneously dispersed state. After 5 min of the polymerization, the methods for termination and post-treatment were the same as those in Example 1. The yield of polymer was 25%; $M_w$, was $4.7 \times 10^5$; $M_w/M_n$ was 3.6.

EXAMPLE 33

At a temperature of −30° C., water, diphenyl ether, $AlCl_3$, $CH_2Cl_2$ and methylcychohexane were mixed to produce an initiating system, wherein the molar ratio of water:diphenyl ether:$AlCl_3$ was $4.47 \times 10^{-2}$:4:1.

At a temperature of −60° C., water, 5 g of LiCl, 0.26 g of NaCl, 0.2 g of sorbitan monooleate, isoprene (IP) and isobutene were added in a total volume of 40 mL into the polymerization reactor, wherein water in the reaction medium had a volume percent of 100%; the IB concentration was 5.8 mol/L in the reaction system; and the molar ratio of IP to IB was 0.006:1. While stirring, the aforesaid initiating system was added to initiate the polymerization to enable the molar ratio of $AlCl_3$ to IB was $3.8 \times 10^{-3}$:1. The polymerization system exhibited a homogeneously dispersed state. After 10 min of the polymerization, the methods for termination and post-treatment were the same as those in Example 1. The yield of copolymer was 70%; $M_w$ was $1.3 \times 10^5$; $M_w/M_n$ was 3.2; and the IP content was 0.9 mol %.

EXAMPLE 34

At a temperature of 10° C., triphenyl phosphorus oxide, water, $AlCl_3$, and toluene were mixed to produce an initiating system, wherein the molar ratio of water:triphenyl phosphorus oxide:$AlCl_3$ was $4.8 \times 10^{-2}$:1:1.

At a temperature of −60° C., water, 5 g of LiCl, 0.26 g of NaCl, 0.008 g of sorbitan monooleate, n-hexane and isobutene were added in a total volume of 40 mL into the polymerization reactor, wherein water in the reaction medium had a volume percent of 57%; and the IB concentration was 1.5 mol/L in the reaction system. While stirring, the aforesaid initiating system was added to initiate the polymerization to enable the molar ratio of $AlCl_3$ to IB was $5 \times 10^{-3}$:1. The polymerization system exhibited a homogeneously dispersed state. After 3 min of the polymerization, the methods for termination and post-treatment were the same as those in Example 1. The yield of copolymer was 94%; $M_w$ was $2.4 \times 10^5$; and $M_w/M_n$ was 4.4.

EXAMPLE 35

At a temperature of 0° C., water, hydrogen chloride, $AlCl_3$, diphenyl sulfoxide, $CH_2Cl_2$ and cyclohexane were mixed to produce an initiating system, wherein the molar ratio of water:hydrogen chloride:diphenyl sulfoxide:$AlCl_3$ was $1.2 \times 10^{-2}$:$7 \times 10^{-3}$:1:1.

At a temperature of −60° C., n-hexane, isobutene, 5 g of LiCl, 0.26 g of NaCl, water and 0.001 g of sorbitan monooleate were added in a total volume of 40 mL into the polymerization reactor, wherein the aqueous medium in the reaction medium had a volume percent of 57% and the IB concentration was 1.5 mol/L in the reaction system. While stirring, the aforesaid initiating system was added to initiate the polymerization to enable the molar ratio of $AlCl_3$ to IB was $1 \times 10^{-2}$:1. The polymerization system exhibited a homogeneously dispersed state. After 5 min of the polymerization, the methods for termination and post-treatment were the same as those in Example 1. The yield of polymer was 68%; $M_w$ was $2.4 \times 10^5$; and $M_w/M_n$ was 3.8.

EXAMPLE 36

At a temperature of 10° C., water, trimethyl phosphate and $AlCl_3$ were mixed to produce an initiating system, wherein the molar ratio of water:trimethyl phosphate:$AlCl_3$ was $4 \times 10^{-2}$:1:1.

At a temperature of −60° C., water, 5 g of LiCl, 0.26 g of NaCl, 0.005 g of polyoxyethylene sorbitol annhydride monolaurate, n-hexane and isobutene (IB) were added in a total volume of 40 mL into the polymerization reactor, wherein the aqueous medium in the reaction medium had a volume percent of 57% and the IB concentration was 1.5 mol/L in the reaction system. While stirring, the aforesaid initiating system was added to initiate the polymerization to enable the molar ratio of $AlCl_3$ to IB was $5\times10^{-3}$:1. The polymerization system exhibited a homogeneously dispersed state. After 5 min of the polymerization, the methods for termination and post-treatment were the same as those in Example 1. The yield of polyisobutene was 36%; and $M_w$ was $1.0\times10^6$.

EXAMPLE 37

At a temperature of $-30°$ C., the mixed solution of water, $AlCl_3$ and $CH_2Cl_2$ was added into diphenyl ether to produce a mixed solution for standby, wherein the molar ratio of water: diphenyl ether:$AlCl_3$ was $4.8\times10^{-3}$:1:1.

At a temperature of $-60°$ C., water, 5 g of LiCl, 0.26 g of NaCl, 0.1 g of sorbitan monooleate, isobutene (IB) and adducts of isobutene and HCl were added in a total volume of 35 mL into the polymerization reactor, wherein water in the reaction medium was in an amount of 100% and the IB concentration in the polymerization system was 5 mol/L in the reaction system. After homogeneous mixing, the initiating system containing water, adducts of isobutene and HCl, $AlCl_3$ and diphenyl ether was added to initiate the polymerization to enable the molar ratio of the adducts of isobutene and HCl to $AlCl_3$ to be 15, and of $AlCl_3$ to IB to be $6.90\times10^{-3}$:1 in the initiating system. After 10 min of the polymerization, the methods for termination and post-treatment were the same as those in Example 1. The yield of polymer was 83%; and $M_w$, was $1.0\times10^5$.

EXAMPLE 38

At a temperature of $0°$ C., sulfolane, water, $AlCl_3$ and $CH_2Cl_2$ were mixed to produce an initiating system, wherein the molar ratio of water: sulfolane:$AlCl_3$ was $5.3\times10^{-2}$:0.79: 1.

At a temperature of $-60°$ C., n-hexane, isobutene, 7.6 g of LiCl, 0.4 g of NaCl and water were added in a total volume of 50 mL into the polymerization reactor, wherein the aqueous phase in the reaction medium had a volume percent of 63% and the IB concentration in the reaction system was 0.46 mol/L in the reaction system. The aforesaid initiating system was added to initiate the polymerization to enable the molar ratio of $AlCl_3$ to IB to be $3.8\times10^{-2}$:1. Under the stirring condition, a homogeneously dispersed polymerization system was formed. After 2 min of the polymerization, the methods for termination and post-treatment were the same as those in Example 1. The yield of polymer was 52%; and $M_w$ was $5.2\times10^5$; and $M_w/M_n$ was 7.7.

EXAMPLE 39

At a temperature of $0°$ C., water, triphenyl phosphine, $AlCl_3$ and toluene were mixed to produce an initiating system, wherein the molar ratio of water:triphenyl phosphine: $AlCl_3$ was $2.4\times10^{-2}$:1:1.

The polymerization monomers, reaction medium and polymerization temperature were the same as those in Example 11. The aforesaid initiating system was added to initiate the polymerization reaction, to enable the molar ratio of $AlCl_3$ to IB to be $5\times10^{-3}$:1. Thus a homogeneously dispersed polymerization system was formed. After 1 min of the polymerization, the methods for termination and post-treatment were the same as those in Example 1. $M_w$ of the polymer was $5.6\times10^5$; and $M_w/M_n$ was 3.5.

EXAMPLE 40

At a temperature of $40°$ C., water, diphenyl ether and $AlCl_3$ were mixed to produce an initiating system, wherein the molar ratio of water:diphenyl ether:$AlCl_3$ was $5\times10^{-3}$:8:1.

At a temperature of $-60°$ C., isobutene, water, 7.6 g of LiCl, 0.4 g of NaCl and 0.5 mL of oleic acid were added in a total volume of 36 mL into the polymerization reactor, wherein water in the reaction medium was in an amount of 100% and the IB concentration in the reaction system was 1.9 mol/L in the reaction system. While stirring, the aforesaid initiating system deposited for 7 days was added to initiate the polymerization to enable the molar ratio of $AlCl_3$ to IB to be 0.011:1. After 5 min of the polymerization, the methods for termination and post-treatment were the same as those in Example 1. The yield of polymer was 34%; and 14, was $7.6\times10^4$; and $M_w/M_n$ was 3.7.

EXAMPLE 41

At a temperature of $40°$ C., water, diphenyl ether and $AlCl_3$ were mixed for standby, wherein the molar ratio of water: diphenyl ether:$AlCl_3$ was $5\times10^{-3}$:8:1.

At a temperature of $-60°$ C., isobutene, water, 7.6 g of LiCl, 0.4 g of NaCl, benzyl chloride and 0.4 g of sorbitan monooleate were added in a total volume of 44 mL into the polymerization reactor, wherein the aqueous phase in the reaction medium has a volume percent of 100% and the IB concentration in the reaction system was 3.7 mol/L in the reaction system. While stirring, the aforesaid initiating system solution deposited for 7 days was added to initiate the polymerization to enable the molar ratio of benzyl chloride to $AlCl_3$ to be $2.5\times10^{-4}$, and of $AlCl_3$ to IB to be 0.005:1. After 3 min of the polymerization, the methods for termination and post-treatment were the same as those in Example 1. The yield of polymer was 42%; and $M_w$ was $3.8\times10^5$; and $M_w/M_n$ was 2.6.

EXAMPLE 42

At a temperature of $0°$ C., water, diphenyl ether and $AlCl_3$ were mixed to produce an initiating system, wherein the molar ratio of water:diphenyl ether:$AlCl_3$ was At a temperature of $-60°$ C., isobutene, water, 7.6 g of LiCl, 0.4 g of NaCl and 0.22 g of sorbitan monooleate were added in a total volume of 50 ml into the polymerization reactor, wherein water in the reaction medium was in an amount of 100%, the isobutene concentration in the reaction system was 4.6 mol/L. While stirring, the aforesaid initiating system was added to initiate the polymerization so as to enable the molar ratio of $AlCl_3$ to IB to be $2.3\times10^{-3}$:1 After 5 min of the polymerization, the methods for termination and post-treatment were the same as those in Example 1. The yield of polymer was 55%; $M_w$ was $9\times10^4$; $M_w/M_n$ was 3.5.

The present invention is detailed elaborated by means of the specific examples above. However, it shall be understood that the present invention shall not be limited to these specific examples. Within the scope of the present invention, those skilled in the art can make various improvements, but these improvements obviously fall within the scope of the disclosure of the present invention.

The invention claimed is:

1. A polymerization system for cationic polymerization in an aqueous reaction medium, wherein the polymerization system comprises an initiating system, at least one cationic-polymerizable monomer, an aqueous reaction medium, and at least one optional dispersant, wherein the initiating system comprises at least one initiator, at least one additive, at least one Lewis acid, and at least one optional diluent, wherein the at least one additive is an organic compound comprising at least one atom selected from nitrogen, oxygen, sulfur, and phosphor atoms, and wherein the at least one Lewis acid has a formula selected from $MX_n$ and $YR_{n-m}X_m$, wherein M is selected from B, Al, Sn, Ti, Fe, Sb, and Zn; X is selected from F, Cl, and Br; n is 2, 3, 4, or 5; m is 1, 2, or 3; Y is selected from Al, Sn, Ti, and Zn; and R is selected from alkyl, aryl, arylalkyl, and alkylaryl, optionally substituted by at least one halo substituent, whereby the initiating system initiates the cationic polymerization of the at least one cationic-polymerizable monomer in the aqueous reaction medium, and further wherein the aqueous reaction medium comprises water ranging from 3.5% to 100% by volume thereof.

2. The polymerization system according to claim 1, wherein the aqueous reaction medium further comprises at least one water-soluble ionic compound and/or at least one alcohol.

3. The polymerization system according to claim 1, wherein the at least one initiator is selected from a compound that can provide protons, an organic tertiary alkyl or aralkyl functional compound that can provide cationogens, and an adduct of hydrogen halide and monomers.

4. The polymerization system according to claim 1, wherein the alkyl or alkyl in the alkyl-containing group in R is selected from $C1$-$C_{20}$ alkyl, and wherein the aryl or aryl in the aryl-containing group in R is phenyl or naphthyl.

5. The polymerization system according to claim 1, wherein the at least one additive is an organic compound comprising at least one atom selected from oxygen, sulfur, and phosphor atoms.

6. The polymerization system according to claim 1, wherein the at least one additive is an compound comprising at least one group selected from —O—, —CO—, —COO—, —CON—, —S—, —SO—, —OSO—, —P—, —PO—, —$PO_3$—, —$PO_4$—, and —PS—.

7. The polymerization system according to claim 1, wherein the initiating system is in-situ formed in the polymerization system or mixed with other ingredients in the polymerization system after its preparation.

8. An initiating system for initiating a cationic polymerization in an aqueous reaction medium, wherein the initiating system comprises at least one initiator, at least one additive, at least one Lewis acid, and at least one optional diluent, wherein the at least one additive is an organic compound comprising at least one atom selected from nitrogen, oxygen, sulfur, and phosphor atoms, wherein the at least one Lewis acid has a formula selected from $MX_n$ and $YR_{n-m}X_m$, wherein M is selected from B, Al, Sn, Ti, Fe, Sb, and Zn; X is selected from F, Cl, and Br; n is 2, 3, 4, or 5; m is 1, 2, or 3; Y is selected from Al, Sn, Ti, and Zn; and R is selected from alkyl, aryl, arylalkyl, and alkylaryl, optionally substituted by at least one halo substituent, whereby the initiating system initiates the cationic polymerization of the at least one cationic-polymerizable monomer in the aqueous reaction medium, and further wherein the initiating system is to be used in an aqueous reaction medium.

9. The initiating system according to claim 8, wherein the molar ratio of the at least one initiator, additive, and Lewis acid is $(5\times10^{-4}-25)$: (0.01-120):1.

10. A process for polymerizing cationic-polymerizable monomers in an aqueous reaction medium, which comprises the step of polymerizing the polymerization system according to claim 1.

11. The polymerization system according to claim 1, wherein the aqueous reaction medium comprises water ranging from 5% to 100% by volume thereof.

12. The polymerization system according to claim 11, wherein the aqueous reaction medium comprises 100% water.

13. The initiating system according to claim 9, wherein the molar ratio of the at least one initiator, additive, and Lewis acid is $(8\times10^{-4}-20)$: (0.02-100): 1.

* * * * *